US008553767B2

(12) United States Patent
Koto et al.

(10) Patent No.: US 8,553,767 B2
(45) Date of Patent: Oct. 8, 2013

(54) VIDEO DECODING METHOD AND APPARATUS

(75) Inventors: Shinichiro Koto, Kokubunji (JP); Ryusuke Hirai, Tokyo (JP); Noboru Yamaguchi, Yashio (JP); Wataru Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1754 days.

(21) Appl. No.: 11/688,507

(22) Filed: Mar. 20, 2007

(65) Prior Publication Data

US 2007/0230572 A1   Oct. 4, 2007

(30) Foreign Application Priority Data

Mar. 28, 2006   (JP) ................................. 2006-088883

(51) Int. Cl.
*G06F 21/00* (2013.01)
(52) U.S. Cl.
USPC ............ 375/240.12; 375/13; 375/14; 375/15; 375/16; 375/25; 382/162; 382/238; 382/239; 382/268
(58) Field of Classification Search
USPC ............................................. 375/240, 240.12
See application file for complete search history.

(56) References Cited

U.S. PATENT DOCUMENTS

| | | | | |
|---|---|---|---|---|
| 5,777,677 A | * | 7/1998 | Linzer et al. ............. | 375/240.11 |
| 6,229,854 B1 | * | 5/2001 | Kikuchi et al. .......... | 375/240.27 |
| 7,738,726 B2 | * | 6/2010 | Honma et al. ................ | 382/268 |
| 7,949,044 B2 | * | 5/2011 | Winger et al. ........... | 375/240.03 |
| 8,031,772 B2 | * | 10/2011 | Kim ......................... | 375/240.12 |
| 2001/0033696 A1 | * | 10/2001 | Yokose ......................... | 382/238 |
| 2001/0048719 A1 | * | 12/2001 | Takeuchi et al. ......... | 375/240.15 |
| 2002/0075961 A1 | * | 6/2002 | Chen et al. ............... | 375/240.25 |
| 2002/0118757 A1 | * | 8/2002 | Hirase ...................... | 375/240.18 |
| 2003/0194140 A1 | * | 10/2003 | Kimura et al. ................ | 382/238 |
| 2005/0141620 A1 | * | 6/2005 | Hattori ..................... | 375/240.25 |
| 2006/0133675 A1 | * | 6/2006 | Kuo ............................. | 382/232 |

FOREIGN PATENT DOCUMENTS

| | | |
|---|---|---|
| EP | 0 615 384 A2 | 9/1994 |
| EP | 1 292 154 A2 | 3/2003 |
| JP | 2000-4440 | 1/2000 |
| JP | 2000-50272 | 2/2000 |
| JP | 2000-78568 | 3/2000 |
| KR | 2003-0001625 | 1/2003 |
| WO | WO 2005/088983 A2 | 9/2005 |
| WO | WO 2005088983 A2 * | 9/2005 |

* cited by examiner

*Primary Examiner* — Morshed Mehedi
(74) *Attorney, Agent, or Firm* — Oblon, Spivak, McClelland, Maier & Neustadt, L.L.P.

(57) ABSTRACT

A video decoding apparatus includes a decoder to decode video encoded data using a predictive picture signal for a video signal, a compression device compressing the decoded picture signal, a first memory storing the decoded picture signal, a second memory storing the compressed picture signal, a decompression device decompressing the compressed picture signal read from the second memory, a selector selecting one of a decoded picture signal read from the first memory and a compressed/decompressed picture signal from the compression device as a reference picture signal according to at least one of a coding type of the video encoded data in picture unit and a prediction mode in block unit, and a motion compensator performing motion compensation on the reference picture signal to generate a predictive picture signal.

20 Claims, 14 Drawing Sheets

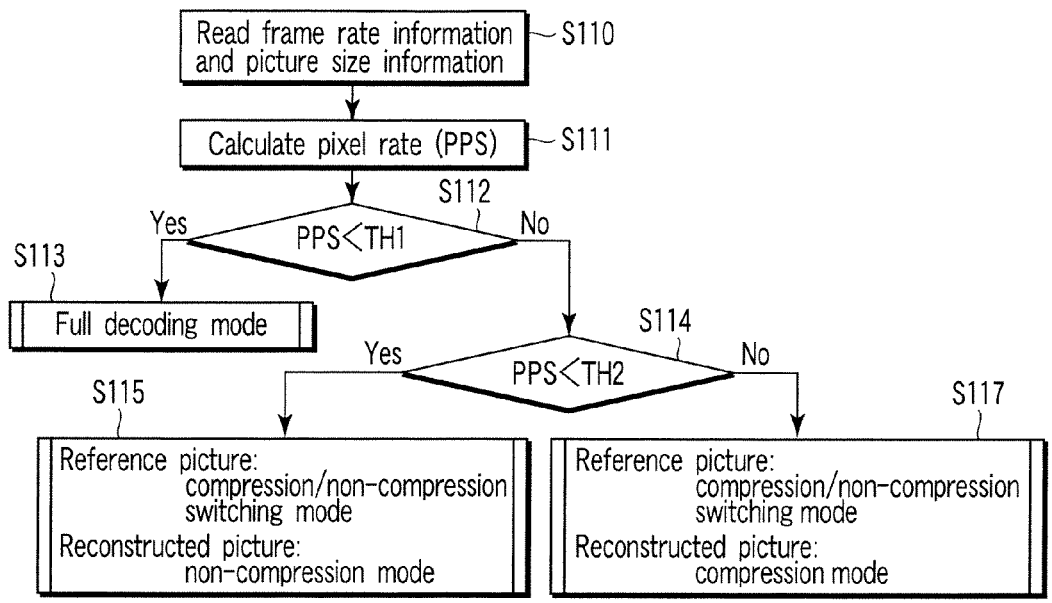
F I G. 7
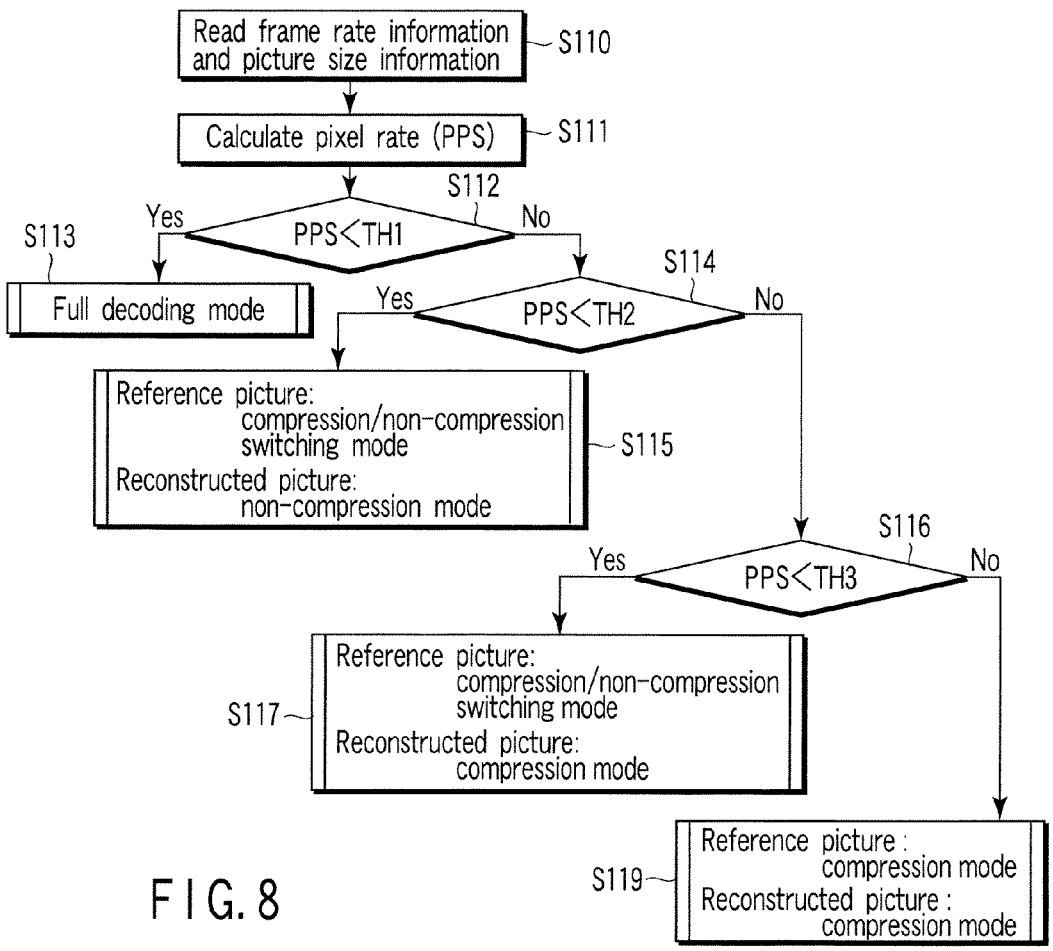
F I G. 8

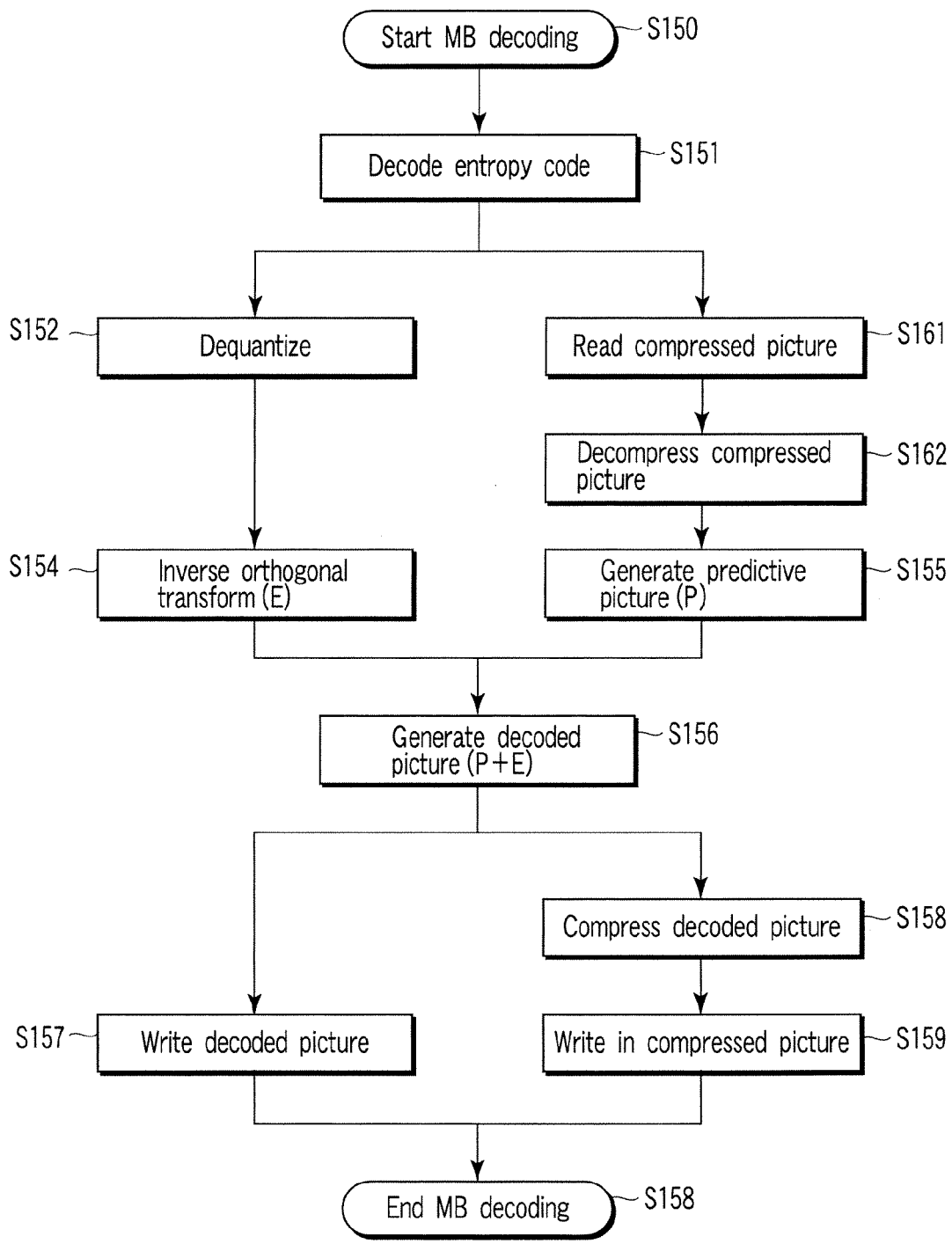
F I G. 14

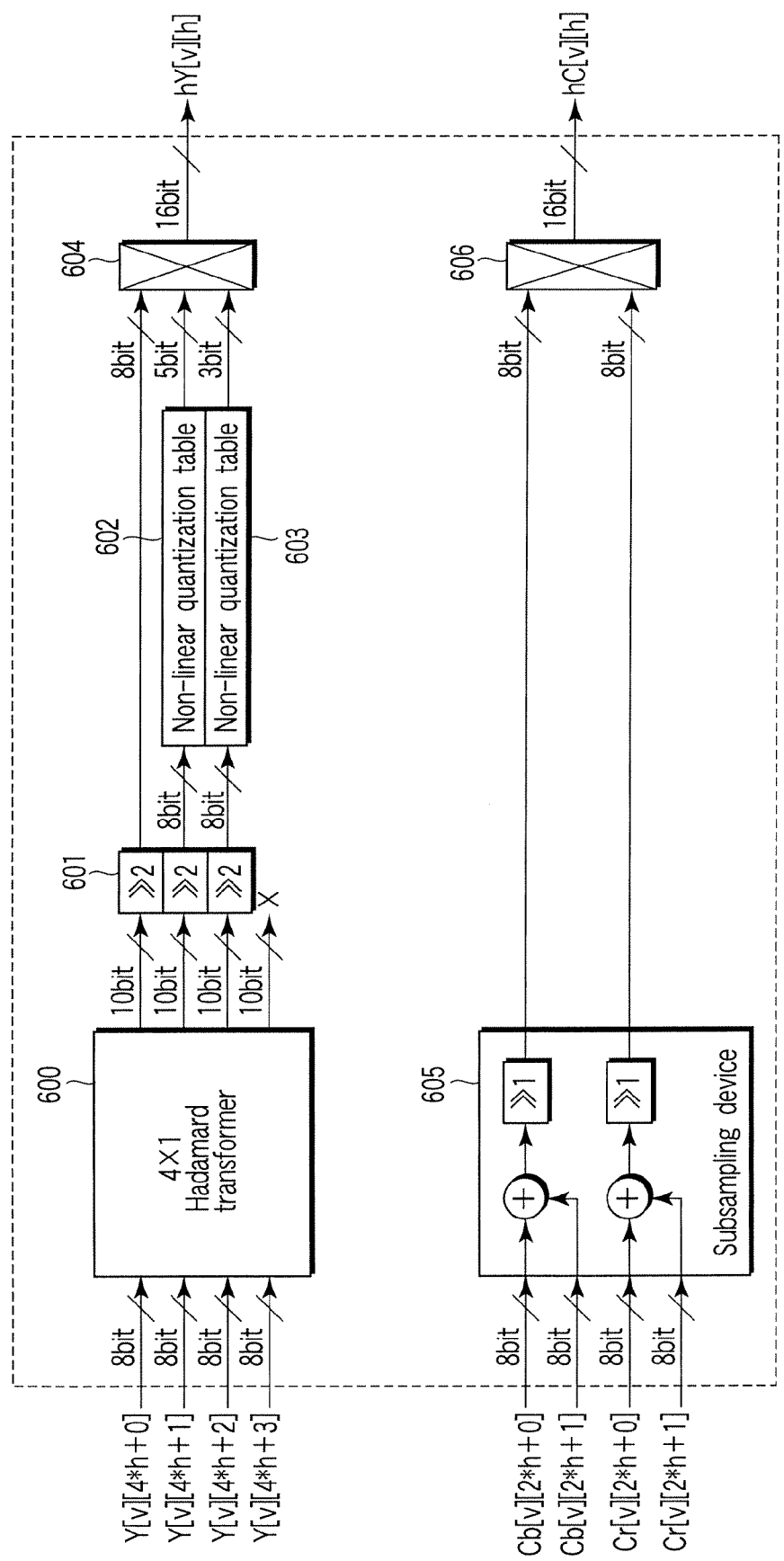
F I G. 20

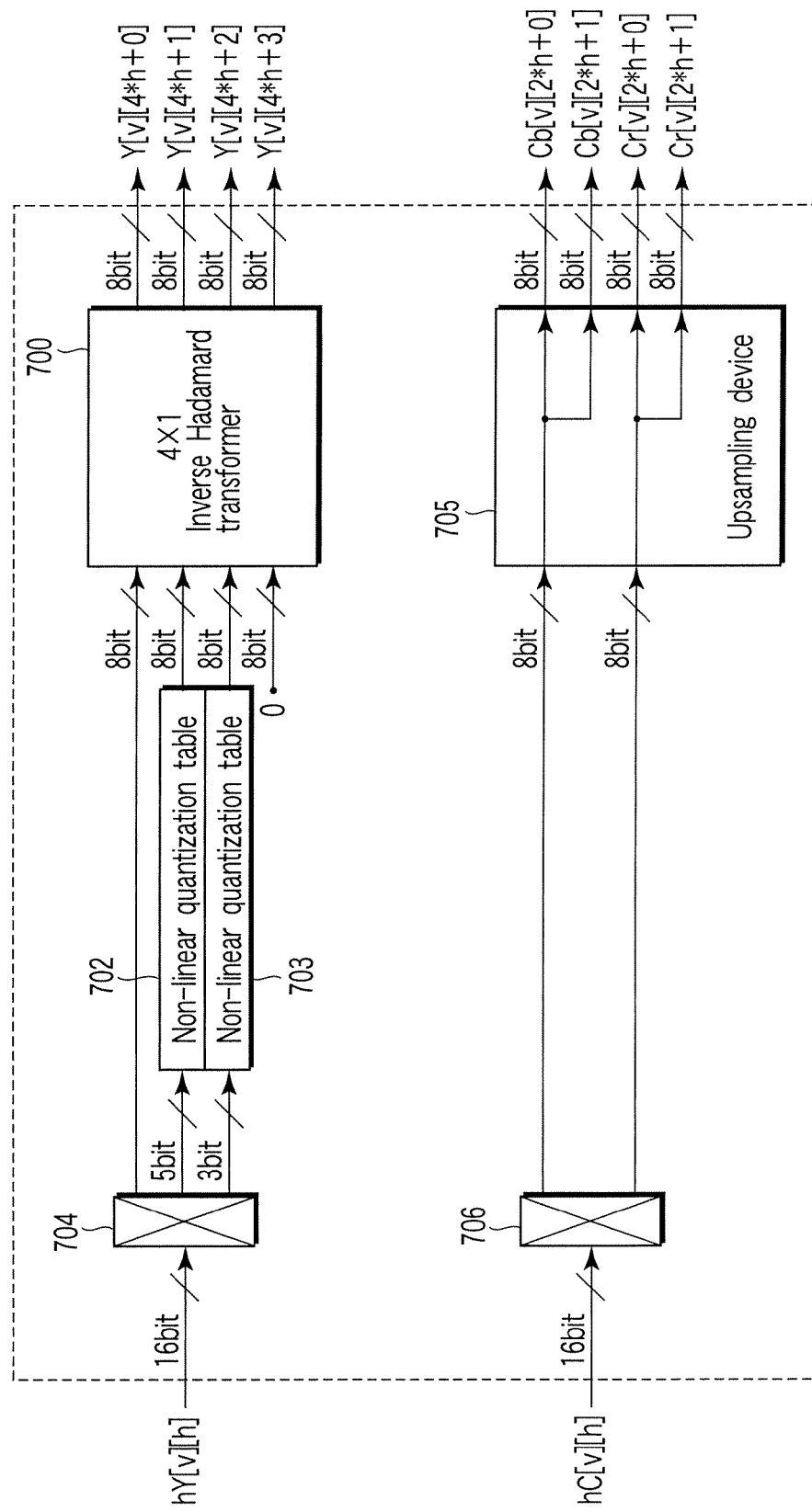
F I G. 21

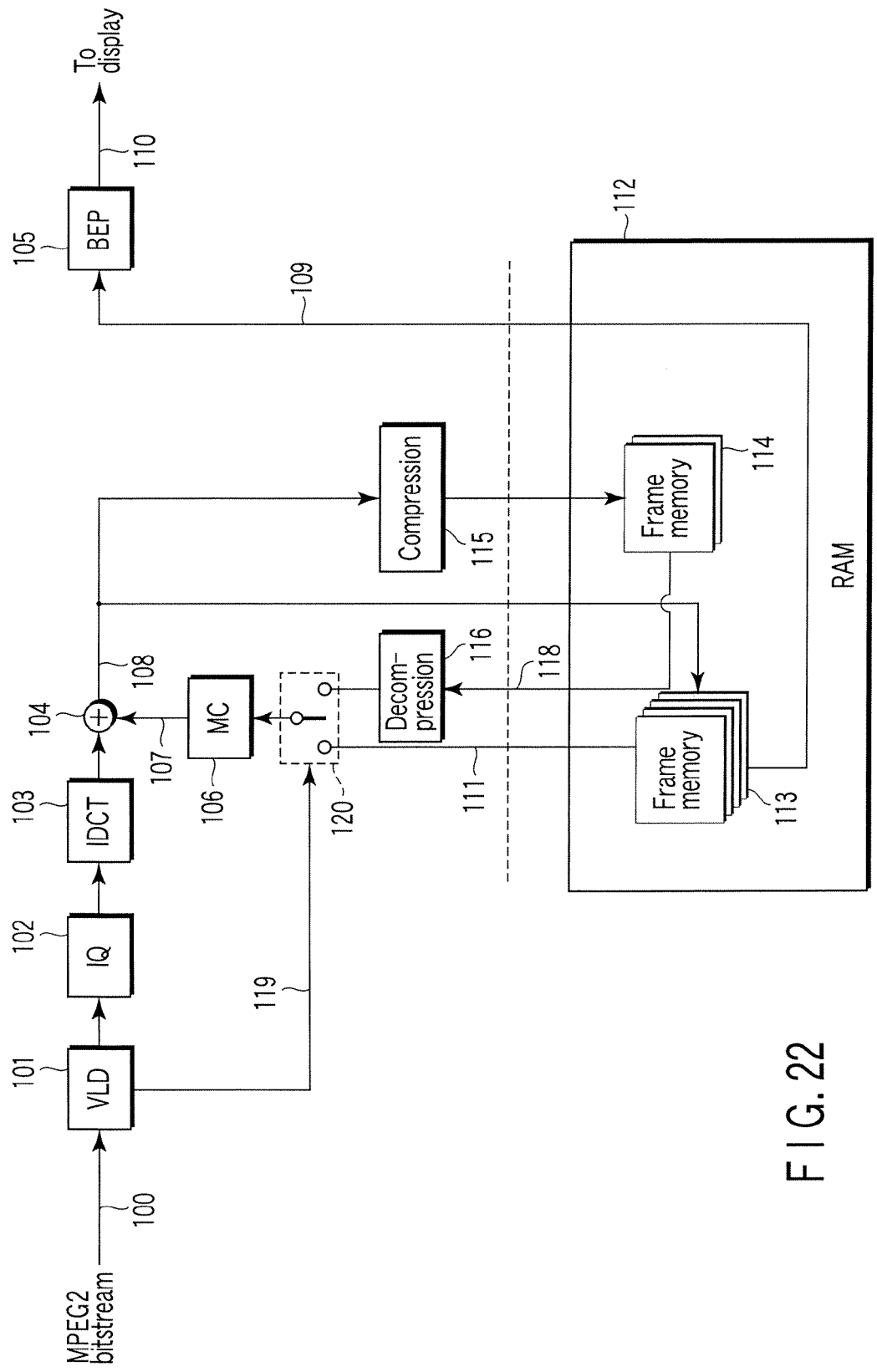
F I G. 22

VIDEO DECODING METHOD AND APPARATUS

CROSS-REFERENCE TO RELATED APPLICATIONS

This application is based upon and claims the benefit of priority from prior Japanese Patent Application No. 2006-088883, filed Mar. 28, 2006, the entire contents of which are incorporated herein by reference.

BACKGROUND OF THE INVENTION

1. Field of the Invention

The present invention relates to a video decoding method and an apparatus.

2. Description of the Related Art

A video encoding international standard system such as MPEG-2 (ISO/IEC 13818-2| ITU-T Rec. H.262), MPEG-4 (ISO/IEC 14496-2), or H.264 (ITU-T Rec. H.2641 ISO/IEC 14496-10) adopts an inter-predictive encoding such as inter-frame or inter-field predictive encoding. In a decoding process of encoded video data based on inter-predictive encoding, a predictive picture is generated by motion compensation using a plurality of reference pictures of a plurality of frames stored in a picture memory.

A picture memory for storing the reference pictures uses an external memory such as DRAM or an internal memory built-in in a decoding LSI. When a predictive picture is generated, the picture memory is frequently accessed. Thus, a broad memory bandwidth is needed. In order for the memory bandwidth to be increased, the number of the pins of LSI must be increased due to increase of a data bit width, or the number of external memories or an operating frequency must be increased. As a result, implementation costs increase.

There is proposed a technique of compressing a decoded picture and storing the compressed decoded picture in a picture memory in order to reduce frequency of the memory access, that is, the memory bandwidth. In this technique, when the decoded picture stored in the picture memory is used as a reference picture or a reconstructed picture for display, it is read out from the picture memory and decompressed. According to, for example, JP-A 2000-50272 (KOKAI) and JP-A 2000-78568 (KOKAI), the decoded picture is converted into a compressed picture by filtering and then stored to the picture memory. The reference picture is generated by decompressing the compressed picture read from the picture memory.

According to the JP-A 2000-04440 (KOKAI), the decoding process is done based on the compressed picture using only low frequency components of video encoded data. The reference picture is generated by compressing the decoded picture by Hadamard transform and quantization, and is stored in the picture memory. At the time of decoding, the compressed reference picture read from the picture memory is decompressed by dequantization and inverse Hadamard transform.

In the memory bandwidth reduction technique described by the above conventional arts, filtering or a process of irreversible compression and decompression such as Hadamard transform and quantization is subjected to the decoded picture for generating the reference picture. As a result, the compression distortion due to the decoding process is superposed on the reference picture. In the case of a video encoding system such as MPEG, the distortion of the reference picture is superposed on the next decoded picture, and the decoded picture on which the distortion is superimposed is used as a next reference picture. In this way, the distortion occurring at the time of decoding is accumulated over time, and is felt as a big noise in a reconstructed picture.

BRIEF SUMMARY OF THE INVENTION

An aspect of the present invention provides a video decoding apparatus comprising: a decoder to decode video encoded data using a predictive picture signal for a video signal to generate a decoded picture signal; a compression unit configured to compress the decoded picture signal to generate a compressed picture signal; a first memory to store the decoded picture signal; a second memory to store the compressed picture signal; a decompression unit configured to decompress the compressed picture signal read from the second memory to generate a compressed/decompressed picture signal; a selector to select one of the decoded picture signal read from the first memory and the compressed/decompressed picture signal as a reference picture signal according to at least one of a coding type of the video encoded data in picture unit and a prediction mode in block unit; and a motion compensator to perform motion compensation on the reference picture signal to generate a predictive picture signal.

BRIEF DESCRIPTION OF THE SEVERAL VIEWS OF THE DRAWINGS

FIG. 7 is a flow chart of explaining a second decoding mode selection method according to the embodiment.

FIG. 8 is a flow chart of explaining a third decoding mode selection method according to the embodiment.

FIG. 14 is a flow chart of representing a procedure of a decoding process executed in units of macroblock using a compressed picture.

FIG. 20 is a block diagram of a compression device for a decoded picture as a third example.

FIG. 21 is a block diagram of a decompression device for a decoded picture as a third example.

FIG. 22 is a block diagram of a video decoding apparatus according to a second embodiment.

DETAILED DESCRIPTION OF THE INVENTION

There will be described embodiments referring to the accompanying drawings.

First Embodiment

Figure 1:
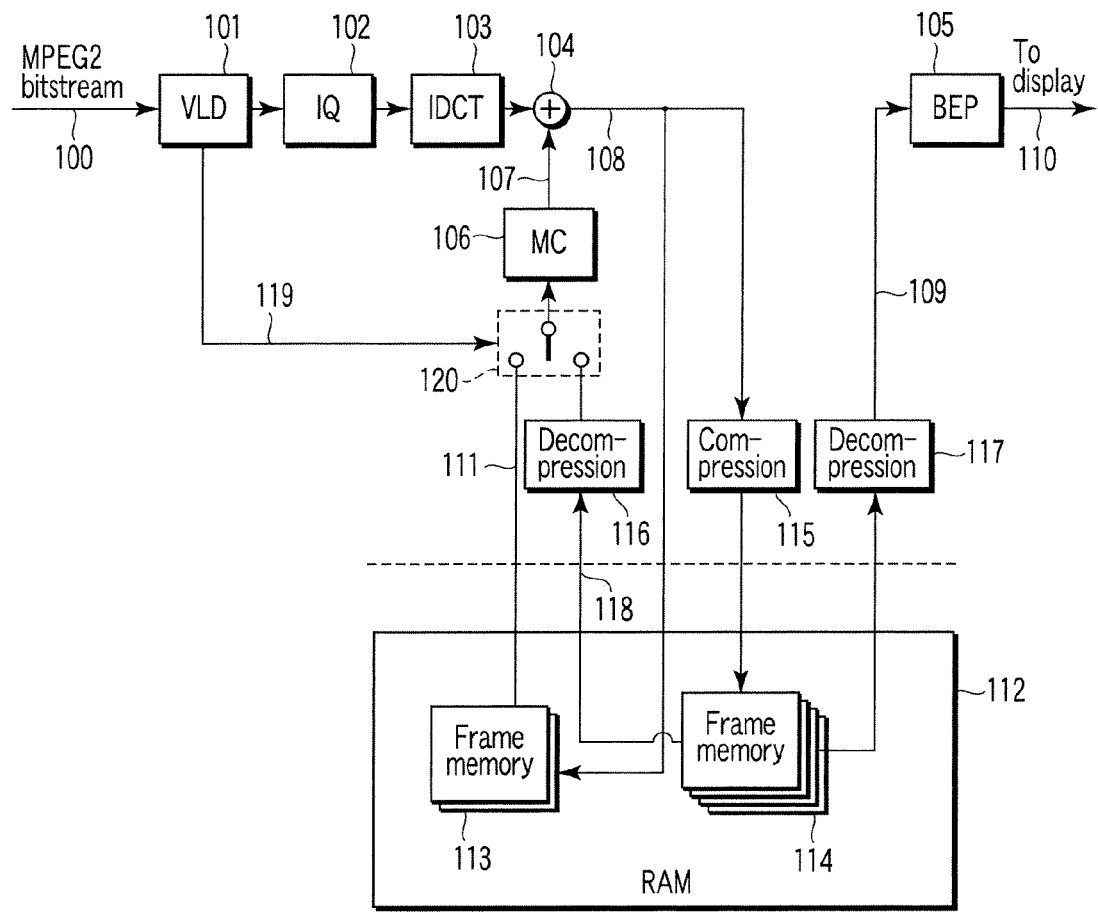
FIG. 1 is a block diagram of a video decoding apparatus according to a first embodiment.

A video decoding apparatus of the first embodiment shown in FIG. 1 is supplied with video encoded data 100 (for example, MPEG-2 bit stream) generated by encoding a moving picture by an encoding system using motion compensated prediction such as MPEG-2. The video encoded data 100 is variable-length decoded by a variable length decoder 101, that is, subjected to a process of decoding a variable-length code. The variable length decoder 101 generates a quantized orthogonal transform coefficient (for example, DCT coefficient) and encoding mode information 119.

The encoding mode information 119 includes information representing a coding type of video encoded data, namely a coding type in picture unit (an encoded picture type), a coding type in pixel block unit (for example, in macroblock unit) (an encoding macroblock type) or a prediction mode in pixel block unit. The quantized orthogonal transform coefficient is dequantized by a dequantizer 102. The dequatized orthogonal transform coefficient is subjected to inverse orthogonal transform with an inverse orthogonal transformer 103 to generate a prediction error signal.

An adder 104 adds the prediction error signal output from the inverse orthogonal transformer 103 and the predictive picture signal 107 output from the motion compensator 106 in units of pixel block and generates a decoded picture signal 108 in units of pixel block. The pixel block is a two-dimensional block including a plurality of pixels or a one-dimensional block. The decoded picture signal 108 is written in a first frame memory 113 in an external memory 112. The decoded picture signal 108 is compressed by a compression device 115. The compressed picture signal generated by the compression device 115 is written in a second frame memory 114. The first frame memory 113 and the second frame memory 114 are provided in the external memory 112 (memory such as DRAM in the outside of a decoding LSI) in the example of FIG. 1. However, they may be provided in an internal memory (memory built in the decoding LSI).

A reference picture selector 120 selects a decoding mode according to encoding mode information 119 (an encoded picture type, an encoding macroblock type or a prediction mode in pixel block unit) output from the variable length decoder 101, and selects a reference picture signal suitable for the selected decoding mode. In other words, the reference picture selector 120 selects, as a reference picture signal, either of an decoded picture signal read from the first frame memory 113 or an picture signal (referred to as compression/decompression picture signal hereinafter) generated by decompressing the compressed picture signal read from the second frame memory 114 with the decompression device 116, according to the selected decoding mode.

A decoding mode selection method will be explained in detail later. The reference picture signal selected with the reference picture selector 120 is input to the motion compensator 106. The compressed picture signal read from the second frame memory 114 is decompressed with the second decompression device 117. The picture signal output from the second decompression device 117 is a signal obtained by decompressing a decoded picture signal compressed by the compression device 115 and stored in the second frame memory 114, and is referred to as a compression/decompression signal.

The compressed/decompressed picture signal is supplied to a back end processor 105. The back end processor 105 performs postprocessing such as scaling, edge enhancing and color correction on the input compressed/decompressed picture signal to output an picture signal (referred as to a reconstructed signal) 110 for use in display. The reconstructed picture signal 110 is supplied to a display device to display a moving picture.

Generally, the video decoding process needs (a) writing of a decoded picture signal in a picture memory, (b) reading of the decoded picture signal from the picture memory for display, namely generation of a reconstructed picture signal, and (c) reading of a reference picture signal from the picture memory for generation of a predictive picture signal. Accordingly, the amount of transfer data per unit time to the picture memory, namely, a memory bandwidth increases greatly. In particular, when video encoded data of a video signal of a high pixel rate such as high-definition frame (high-definition television: HDTV) is decoded, a very broad memory bandwidth is required.

Usually, in order to correspond to the broad memory bandwidth, a plurality of picture memories are arranged in parallel to increase a bit width of data to be transferred at the same time, and a memory element allowing high-speed transfer is used. For this reason, the cost of the picture memory influences an implementation cost of the video decoding apparatus greatly. When moving picture data encoded by motion compensated prediction are decoded, random access to a pixel block of the position in the picture memory, that is indicated by a motion vector is necessary in reading a reference picture signal. Accordingly, overhead of memory access increases, and particularly a high bandwidth is required.

The decoded picture signal is written in the picture memory in units of pixel block continuously. Further, the decoded picture signal for display is read from the picture memory in units of line continuously. Accordingly, overhead of memory access for writing/reading of the decoded picture signal is reduced.

In the first embodiment, when the reference picture signal having need of a broad memory bandwidth is read from an external memory 112 in order to generate a predictive picture signal, the amount of transfer data is reduced to decrease the total memory bandwidth and a cost of the decoding apparatus. In other words, according to the first embodiment, there are provided not only the first frame memory 113 temporarily storing the normal decoded picture signal in the external memory 112 as shown in FIG. 1, but also a second frame memory 114 temporarily storing the decoded picture signal compressed by the compression device 115.

For acquirement of the reference picture signal, a reference picture selector 120 selects (a) a non-compressed decoded picture signal read from the first frame memory 113 when the picture signal is read from the external memory 112 or (b) an picture signal obtained by decompressing a compressed picture signal read from the second frame memory 114 with a decompression device 116, according to the decoding mode corresponding to encoding mode information representing an encoded picture type, an encoding macroblock type or a prediction mode.

According to the video decoding apparatus described above, the memory bandwidth when the picture signal is read from the external memory 112 is effectively reduced in comparison with the conventional video decoding apparatus which generates a reference signal by always reading out a non-compressed decoded picture signal from a picture memory.

When a reference picture signal is generated by compressing a decoded picture signal, storing temporarily the picture signal in a picture memory and decompressing the picture signal read from the picture memory, distortion of the reference picture signal is accumulated over time, resulting in superposing a large noise on a reconstructed picture signal. Such problems are solved by the first embodiment.

The operation of the video decoding apparatus according to the first embodiment will be described in comparison to the operation of the conventional video decoding apparatus or the video decoding apparatus reducing a memory bandwidth as described in the background referring to FIGS. 2 to 5, hereinafter.

Figure 2:
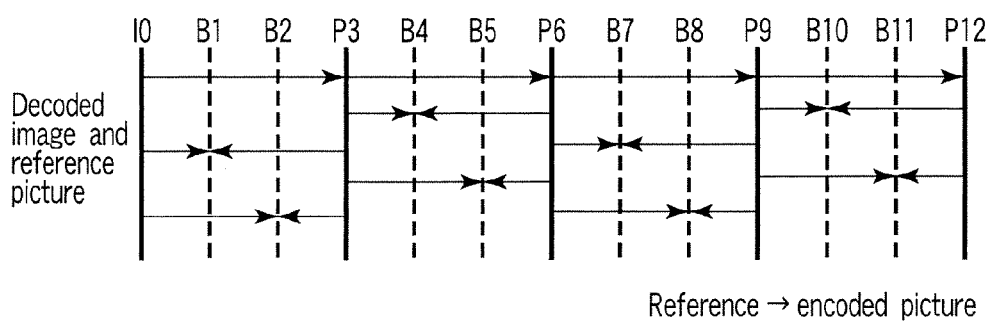
FIG. 2 is a diagram showing a prediction structure of motion compensated prediction interframe encoding.

In a MPEG-2 prediction structure of motion compensated prediction interframe encoding as shown in FIG. 2, I0, P1, ... show frames of each coded picture of video encoded data, and arrows show a relation of inter-frame prediction from a reference picture to an encoded picture. I, P and B indicate an intra frame encoded picture (I picture), a forward prediction encoded picture (P picture), and a bidirectional predictive encoded picture (B picture), respectively. Numbers added to I, P and B show an order of display frames. The previously described encoded picture type represents I picture, P picture or B picture.

In the conventional video decoding apparatus, at first, I0 picture is decoded, and P3 picture is decoded using the decoded picture of I0 picture as a reference picture. Further, B1 and B2 pictures are decoded using the decoded pictures of the I0 and P3 pictures as reference pictures. The P6 picture is decoded using the decoded picture of P3 picture as a reference picture. In this way, decoding is done sequentially.

The decoding operation of the video decoding apparatus of a conventional art intended to reduce the memory band width will be described referring to FIG. 3. The decoding order of pictures is similar to FIG. 2. At first, I0 picture is decoded, and then the decoded picture of the I0 picture is subjected to an irreversible compression/decompression process, whereby a compressed/decompressed picture 400 is generated. A compression noise (expressed by symbol * in FIG. 3) occurring due to the irreversible compression process is superimposed on the compressed/decompressed picture 400. Because P3 picture is decoded using the compressed/decompressed picture 400 as a reference picture, the noise superimposed on the compressed/decompressed picture 400 is superimposed on the decoded picture of P3 picture as-is. The irreversible compression/decompression process is subjected to the decoded picture of P3 picture to generate a compressed/decompressed picture 401. The compression noise is superimposed on the compressed/decompressed picture 401 due to a further irreversible compression process.

B1 and B2 pictures are decoded using the compressed/decompressed pictures 400 and 401 as reference pictures. The compression noises of the compressed/decompressed pictures 400 and 401 are superimposed on the decoded pictures of B1 and B2 pictures. However, in bidirectional prediction of B picture, since a predictive picture is formed of an average of two reference pictures, random compression noise due to compression of the reference picture is reduced by averaging the reference pictures. Subsequently, P6 picture is decoded using the compressed/decompressed picture 401. Further, the irreversible compression process is performed on the decoded picture of P6 picture to generate a compressed/decompressed picture 402. The compression noise is cumulatively superimposed on the compressed/decompressed picture 402 due to the further irreversible compression process.

Figure 3:
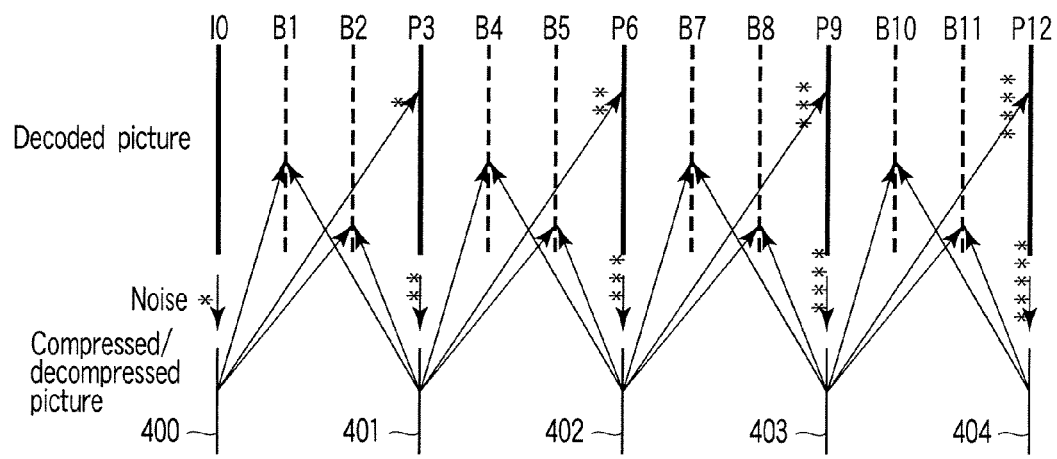
FIG. 3 is a diagram illustrating a decoding operation of a video decoding apparatus making it possible to reduce a memory bandwidth.

In the decoding process shown in FIG. 3 in this way, the compression noise due to the compression process of the reference picture is accumulated over time according to the structure of interframe predictive coding. The accumulated compression noise is superimposed on the decoded picture for display, too. As a result, the reconstructed picture signal is extremely deteriorated in picture quality.

Figure 4:
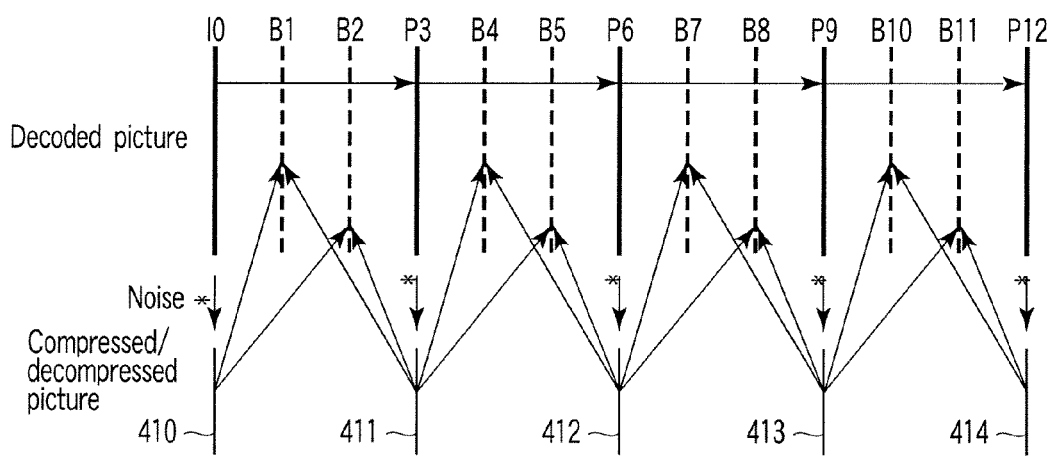
FIG. 4 is a diagram illustrating a decoding operation according to a first embodiment.

FIG. 4 shows the decoding operation of the video decoding apparatus according to the first embodiment shown in FIG. 1. The decoding order of the pictures is similar to FIGS. 1 and 2. At first, I0 picture is decoded similarly to FIG. 2. The decoded picture of the I0 picture is subjected to the irreversible compression process and saved in the second frame memory, temporarily. Further, the decoded picture is subjected to the decompression to produce a compressed/decompressed picture 410. Compression noise (expressed by symbol * in FIG. 3) is superimposed on the compressed/decompressed picture 410 due to the irreversible compression process. The P3 picture is decoded by use of not the compressed/decompressed picture 410 but the non-compression decoded picture of I0 picture as a reference picture. The compression noise due to compression of the reference picture is not superimposed on the decoded picture of P3 picture.

The irreversible compression process is subjected to the decoded picture of P3 picture to generate a compressed/decompressed picture 411. The compression noise is superimposed on the compressed/decompressed picture 411 due to the irreversible compression process. The B1 and B2 pictures are decoded using the compressed/decompressed pictures 410 and 411 as reference pictures. The compression noises of the compressed/decompressed pictures 410 and 411 are superimposed on the decoded pictures of B1 and B2 pictures. However, in bidirectional prediction of B picture, the average of two reference pictures forms a predictive picture, so that the random compression noise due to compression of the reference picture is reduced by averaging the reference pictures. P6 picture is decoded using the non-compression decoded picture of P3 picture as a reference picture.

In this way, the video decoding apparatus according to the first embodiment decodes P picture by using the non-compression decoded picture (for example, decoded picture of I0 picture) as a reference picture, so that the compression noise due to the compression process of the reference picture is not accumulated. In contrast, since B picture which cannot use the decoded picture as a reference picture is decoded using the compressed/decompressed picture as a reference picture, the memory bandwidth associated with reading of picture can be reduced. Because the decoded picture of B picture is not used as a reference picture, temporal accumulation of the compression noise of the reference picture is not done, with the result that picture quality is not extremely deteriorated. The bidirectional prediction of B picture needs reading of two reference pictures, whereby a broader memory bandwidth than that of the P picture becomes necessary. However, it is possible to reduce the peak memory bandwidth effectively by using the compressed/decompressed picture as a reference picture.

Figure 5:
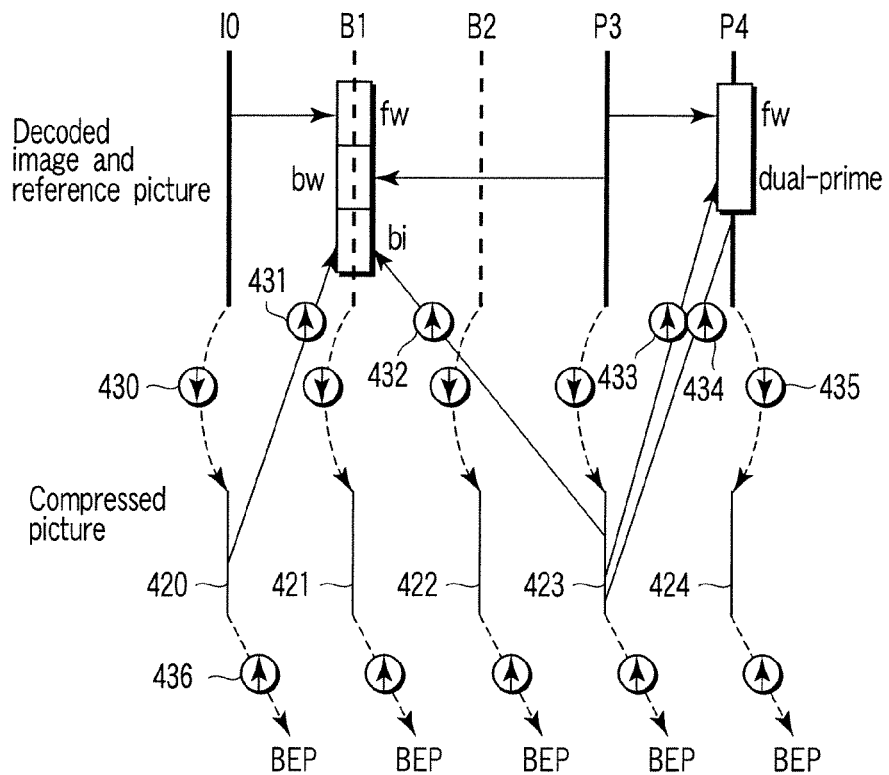
FIG. 5 is a diagram illustrating another decoding operation of the first embodiment.

FIG. 5 illustrates another decoding operation of the video decoding apparatus according to the first embodiment shown in FIG. 1. At first, compression 430 is performed on the decoded picture of I0 picture to generate a compressed picture 420. Subsequently, P3 picture is decoded using the non-compression decoded picture of picture as a reference picture similarly to FIG. 4. The decoded picture of P3 picture is compressed to generate a compressed picture 423. B1 picture is decoded using the non-compression decoded pictures of I0 and P3 pictures and compressed pictures 420 and 423 obtained by compressing them.

The B picture contains a forward prediction pixel block fw predicted only by a forward reference frame (I0 picture, here), a backward prediction pixel block bw predicted only by a backward reference frame (P3 picture, here) and a bidirectional prediction pixel block bi predicted by an average of predictive pictures of bidirectional reference frames (I0 and P3 pictures, here). In other words, a prediction mode in pixel unit which represents whether the prediction pixel block of B picture is a forward prediction pixel block, a backward prediction pixel block or a bidirectional prediction pixel block is prepared for B picture.

In the decoding operation of FIG. 5, the forward prediction pixel block fw is decoded using the non-compression decoded picture of I0 picture as a reference picture, and the backward prediction pixel block bw is decoded using the non-compression decoded picture of P3 picture as a reference picture. In this way, the forward prediction pixel block or backward prediction pixel block needs only one reference picture for decoding. Therefore, a broader memory bandwidth is not needed. Accordingly, the decoded picture corresponding to the forward prediction pixel block and the backward prediction pixel block is prevented from deterioration by using the non-compression decoded picture containing no compression noise as a reference picture as described above. In the case of bidirectional prediction pixel block bi, compressed pictures 420 and 423 are read from the external memory, and a predictive picture is generated by an average of two reference pictures by using two compressed/decompressed pictures obtained by performing decompressions 431 and 432 on the pictures 420 and 423 as the reference pictures. In general, the bidirectional prediction pixel block which needs two reference pictures requests a broad memory bandwidth. In contrast, according to the decoding operation of FIG. 5, the compressed picture is stored in the external memory, and the predictive picture signal is generated using the compressed/decompressed picture obtained by decompressing the compressed picture read from the external memory as a reference picture. This decoding operation makes it possible to reduce the memory bandwidth. Further, in the case of the bidirectional prediction pixel block, the predictive picture is generated by an average of two reference pictures. Therefore, the compression noises of the reference pictures are reduced by being averaged, with the result that picture quality deterioration can be suppressed.

In this way, only the bidirectional prediction pixel block of B picture is decoded by motion compensated prediction using the compressed/decompressed picture as a reference picture. Therefore, the peak of memory bandwidth can be reduced. Further, it is possible to minimize the picture quality degradation of the decoded picture obtained by using the compressed/decompressed picture.

The decoded picture of B1 picture, which is not used as a reference picture is compressed and stored in the external memory as the compressed picture 421. In the case of the decoded pictures of I and P pictures which are used as reference pictures, both of the non-compression decoded picture signal and the compressed picture signal are temporarily stored in the external memory. In the case of the decoded picture of B picture, only a compressed picture signal is temporarily stored in the external memory. B2 picture is decoded like B1 picture. Subsequently, P4 picture is decoded. P4 picture follows P3 picture in order of display.

In MPEG-2 system, it is possible to select, for P picture following I or P picture in terms of time, not only a forward prediction pixel block using one reference pixel block but also a block (referred to as a dual prime prediction pixel block) of a prediction mode referred to as a dual prime prediction to assume an average of two reference pixel blocks to be a predictive picture. In other words, for P picture following I or P picture in terms of time is prepared a prediction mode in units of pixel block, which represents whether at least the prediction pixel block is a forward prediction pixel block making use of a single reference picture or a dual prime prediction pixel block making use of a plurality of reference pictures. The dual prime prediction needs reading of two reference pictures like the bidirectional prediction of B picture, and thus a broad memory bandwidth is required.

According to the decoding operation of FIG. 5, in P picture (P4 picture, here) on the backward side of two P pictures continuing in a time direction (for example, P3 and P4 pictures), the forward prediction pixel block fw is decoded using a non-compression reference picture (P3 picture, here). In the case of the dual prime prediction pixel block, two reference blocks of the compressed picture 423 stored in the external memory are read and subjected to decompression processes 433 and 434, respectively. A peak memory bandwidth is reduced by generating a predictive picture from an average of two decompressed reference blocks. In the dual prime prediction, the predictive picture is generated by an average of two reference pictures or a linear sum of them like the bidirectional prediction of B picture. The compression noise of the compressed picture is reduced by averaging the reference pictures, and deterioration of picture quality is minimized. A compressed picture 424 is generated by subjecting the decoded picture of P4 picture to a compression process 435, and stored in the external memory.

The decoded pictures are displayed by being reordered from encoding order to display order. In the decoding operation of FIG. 5, the compressed pictures 420, 421, 423 and 424 stored in the external memory 112 are read in display order, and decompressed with the decompression device 117, and then sent to the display device through the back end processor 105 to display a moving picture. When the compressed/decompressed picture is used for displaying the moving picture in this way, the amount of decoded picture data to be read from the external memory 112 for use in display is reduced, resulting in allowing reduction of the memory bandwidth. Further, because B picture is not used as a reference picture, only the compressed picture has only to be stored temporarily in the external memory 112. As a result, the amount of picture data to be written in the external memory 112 can be reduced.

Summarizing the above, the following advantages are obtained by the first embodiment.

(1) In the case of reading in random the picture from the external memory 112, the compressed picture is read out when decoding a prediction pixel block using two reference pictures that needs the broad memory bandwidth and decoding the B picture which is not used as a reference picture. As a result, the memory bandwidth at the time of random reading of picture can be largely reduced.

(2) When the decoded picture is written in the external memory 112, the decoded picture of B picture which is not used as a reference picture is compressed and then stored in the external memory 112, whereby the memory bandwidth can be reduced.

(3) When the decoded picture is read from the external memory 112 for display of a moving picture, the compressed decoded picture (compressed picture) is read from the external memory 112 and decompressed to generate a reconstructed video signal. As a result, the memory bandwidth can be reduced.

(4) When the decoded pictures of I and P pictures used as reference pictures are written in the external memory 112, the compressed decoded picture as well as the non-compression decoded picture must be written in the external memory 112. As a result, the memory bandwidth increases. However, since the decoded picture is written in the memory according to continuing address, overhead of memory access is small enough in comparison with reading of the reference picture. Further, increase of memory bandwidth is small in comparison with reduction of another memory bandwidth.

In this way the total memory bandwidth in the decoding process is largely reduced in comparison with the normal video decoding apparatus. In other words, according to the first embodiment, the bit width of the external memory and the number of external memories can be reduced by reduction of the memory bandwidth for the external memory. The operation clocks for the external memory can be reduced in number. Accordingly, it is possible to realize low-costing and low-power consuming of the video decoding apparatus while minimizing picture quality degradation.

(Decoding Mode Selection Method)

In this embodiment, it is possible as described below to select the reference picture from either the non-compression decoded picture or the compressed picture, and the decoded picture to be displayed from either the non-compression decoded picture or the compressed decoded picture. When the non-compression decoded picture is used together with both of the reference picture and the reconstructed picture for use in display, the decoding mode is similar to the normal decoding mode.

In the following descriptions, the normal decoding mode using the non-compression decoded picture for the reference picture and the reconstructed picture is referred to as "full decode". The decoding mode using the compressed/decompressed picture as a reference picture is referred to as "compression reference decode". The decoding mode using the non-compression decoded picture as a reference picture is referred to as "full reference decode". There will be explained a method of selecting various decoding modes in the embodiment, hereinafter.

(First Decoding Mode Selection Method)

Figure 6:
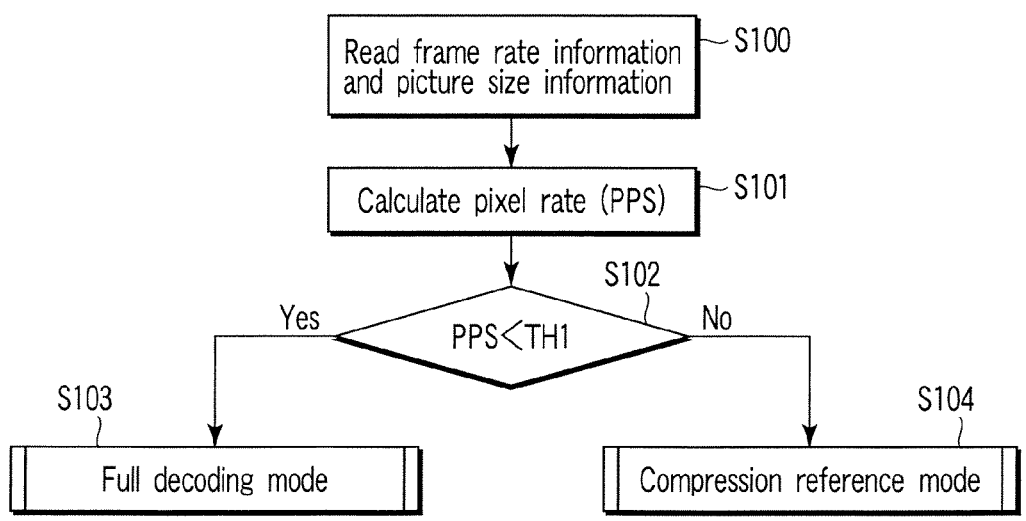
FIG. 6 is a flow chart of explaining a first decoding mode selection method according to the embodiment.

FIG. 6 shows a procedure of the first decoding mode selection method. According to the first decoding mode selection method, a decoding mode is selected in units of encoded moving picture sequence. At first, a frame rate of the encoded video sequence and information of a picture size are read (step S100). The frame rate is multiplied by the picture size to calculate a pixel rate per unit time (the number of pixels per second: PPS) (step S101). A threshold TH1 is compared with the pixel rate calculated in step S101 (step S102). If the pixel rate is less than TH1, the full decode mode is selected (step S103). When the pixel rate is more than TH1, the compression reference mode is selected (step S104). The memory bandwidth of the external memory 112 can be usually supposed to be proportionality relation with the pixel rate. When the threshold TH1 is set to the maximum pixel rate at which the decoding apparatus can process in the full decode mode or less than the maximum pixel rate, the optimum decoding mode for minimizing picture quality deterioration can be selected.

(Second Decoding Mode Selection Method)

The second decoding mode selection method according to the embodiment will explained referring to FIG. 7 hereinafter. In the second decoding mode selection method, the operation mode is selected in units of encoded video sequence like the first decoding mode selection method. The frame rate of the encoded video sequence and information of the picture size are read like the first decoding mode selection method (step S110). The pixel rate (pixel per second (PPS)) is calculated by multiplying the frame rate by the picture size (step S111). The pixel rate calculated in step S111 is compared with the first threshold TH1 (step S112). If the pixel rate is less than TH1, the full decode mode is selected (step S113).

When the pixel rate is not less than TH1, the pixel rate is compared with the second threshold TH2 (step S114). When the pixel rate is less than TH2, the compression/non-compression switching mode is selected for the reference picture, and the non-compression mode is selected for the reconstructed picture (step S115). In the compression/non-compression mode, the non-compression decoded picture read from the first frame memory 113 and the compressed/decompressed picture obtained by decompressing the decoded picture read from the second frame memory 114 are adaptively switched. In the non-compression mode, the non-compression decoded picture is selected (step S115).

When the pixel rate is more than TH2, the compression/non-compression mode is selected for the reference picture like step S115, and the compression mode using the compressed/decompressed picture is selected for the reconstructed picture (step S117). The threshold TH2 is a value larger than the threshold TH1, and set at such value that the decoding apparatus can decode the encoded video data more correct than the process of step S115, namely, the memory bandwidth does not lack.

The memory bandwidth necessary for decoding the video encoded data of the same pixel rate increases in order of steps S117, S115 and S113. Accordingly, use of the second decoding mode selection method makes it possible to select the optimum decoding mode in which the picture quality deterioration is minimized, according to the pixel rate of the input video encoded data.

(Third Decoding Mode Selection Method)

The third decoding mode selection method of the embodiment will be described referring to FIG. 8. In the flow chart of FIG. 8, a step S116 for comparing the pixel rate with the third threshold TH3 is added to that of FIG. 7. When the pixel rate exceeds TH3 in step S116, the compression mode is always selected for the reference picture and reconstructed picture (step S119). In other words, the compressed decoded picture is read from the second frame memory 114 in order to generate the reference picture and reconstructed picture in step S119. The reference picture and reconstructed picture are generated using the compressed/decompressed picture obtained by decompressing the compressed decoded picture read from the second frame memory 114.

When the pixel rate is not more than TH3 in step S116, the compression/non-compression mode is selected for the reference picture like step S115, and the compression mode using the compressed/decompressed picture is selected for the reconstructed picture (step S117). The other steps of FIG. 8 is similar to those of FIG. 7. The threshold TH3 is a value larger than the threshold TH2, and determined from the maximum pixel rate at which the decoding can be done in step S117.

The memory bandwidth necessary for decoding the video encoded data of the same pixel rate increases in order of steps S119, S117, S115 and S113. Accordingly, use of the third decoding mode selection method makes it possible to select the optimum decoding mode in which the picture quality deterioration is minimized, for the input video encoded data according to the pixel rate.

(Fourth Decoding Mode Selection Method)

Figure 9:
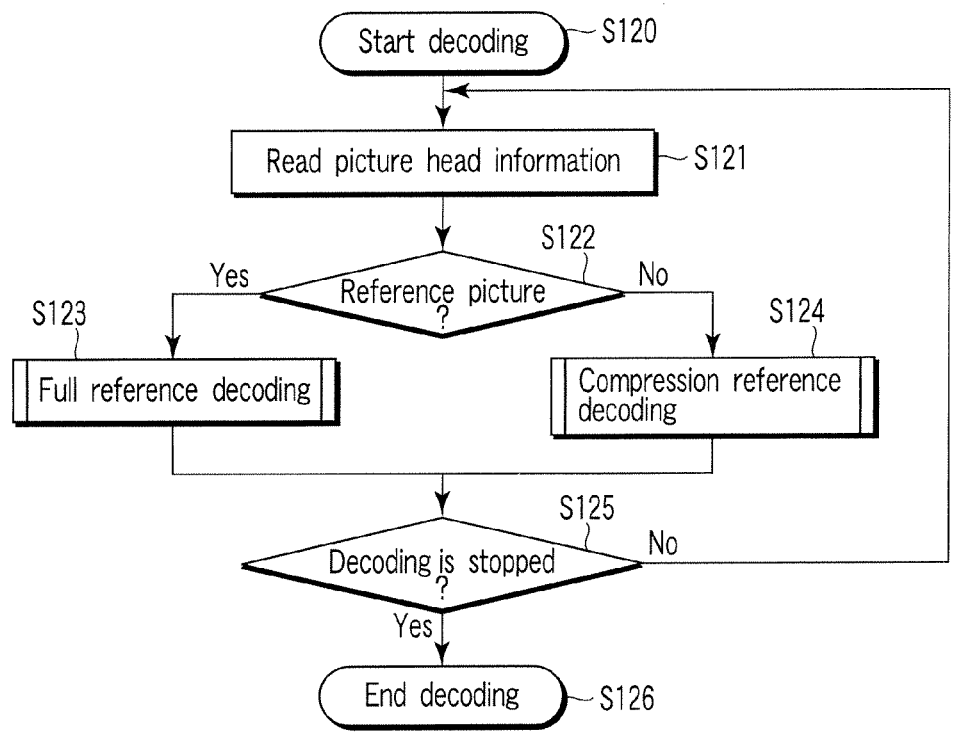
FIG. 9 is a flow chart of explaining a fourth decoding mode selection method according to the embodiment.

The fourth decoding mode selection method of the embodiment will be described referring to FIG. 9. In the fourth decoding mode selection method, the operation mode is selected in units of encoded picture of the video encoded data 100. When decoding is started (step S120), header information (picture header information) is read every encoded picture (step S121). It is determined according to the picture header information whether the encoded picture is a reference picture (whether it is an inter-encoded picture used as a reference picture) (step S122). In the case of an example that the encoding method of the video encoded data 100 is MPEG-2, the picture header information is analyzed in step S122 to check the coding type (picture_coding_type) corresponding to the syntax element of the picture header. If this coding type is B picture, "No", that is, what the encoded picture is not a reference picture is determined. If this coding type is I or P picture, "Yes", that is, what the encoded picture is a reference picture is determined.

If the encoding system of the video encoded data 100 is H.264, "nal_ref_idc" of a NAL unit syntax prescribed with the H.264 standard is referred to in step S122. If the value of "nal_ref_idc" is 0, the encoded picture is not a reference picture. Accordingly, "No", namely, what the encoded picture is not a reference picture is determined in step S122. If the value of "nal_ref_idc" is non-zero, the encoded picture is a reference picture. Accordingly, "Yes", namely, what the encoded picture is a reference picture is determined in step S122.

The encoded picture that "Yes" is selected in step S122 is decoded by a full reference decode mode (step S123). The encoded picture that "No" is selected in step S123 is decoded by the compression reference decode mode using the compressed/decompressed picture obtained by decompressing the compressed decoded picture read from the second frame memory 114 as a reference picture (step S124).

Subsequently, it is checked whether or not decoding is continued (step S125). When the decoding is continuously done, the process returns to step S121 to decode the next picture. When the decoding is stopped, the decoding is finished in step S126.

In this way, according to the fourth decoding mode selection method, it is possible to prevent propagation of compression noise due to compression of the reference picture in a time direction by performing normal full reference decoding on the encoded picture used as a reference picture. When the encoded picture is not used as a reference picture, the compressed/decompressed picture is used as reference picture, whereby the memory bandwidth for reading a picture for use in a reference picture is reduced. Accordingly, the memory bandwidth can be reduced effectively while the picture quality degradation of the decoded picture is suppressed.

(Fifth Decoding Mode Selection Method)

Figure 10:
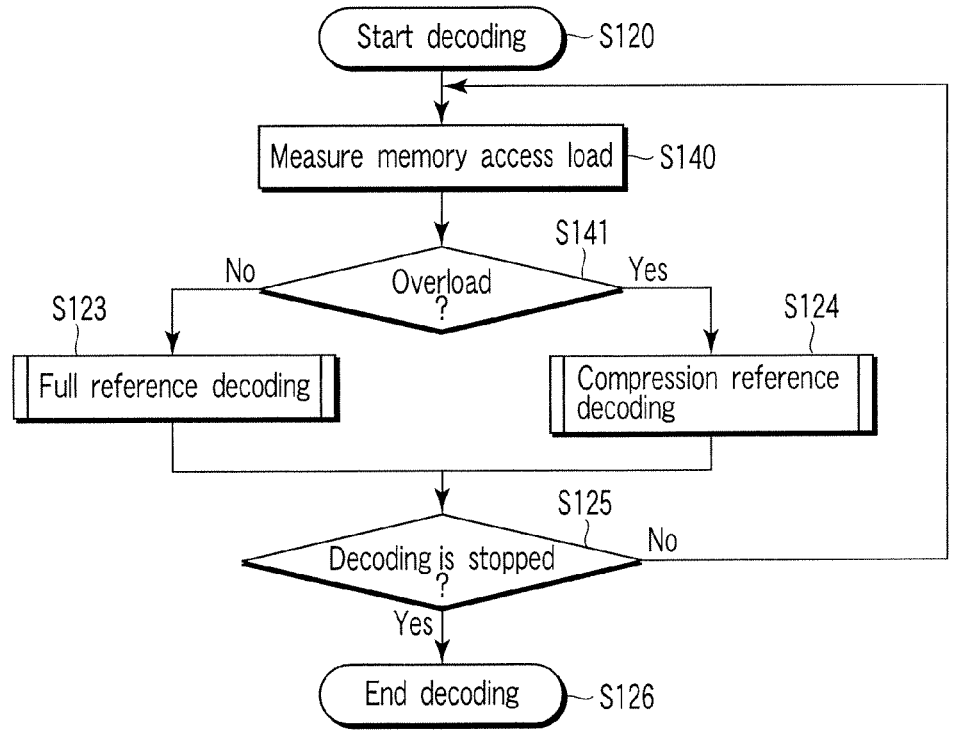
FIG. 10 is a flow chart of explaining a fifth decoding mode selection method according to the embodiment.

The fifth decoding mode selection method of the embodiment will be described referring to FIG. 10. In the fifth decoding mode selection method, the decoding mode is selected in units of encoded picture like the fourth decoding mode selection method. As shown in FIG. 9, the selection of the full reference decode (step S123) and the compression reference decode (step S124) using the compression reference frame memory, is done by determining in step S122 whether the encoded picture to be decoded is used as a reference picture.

In the fifth decoding mode selection method, load of access for the external memory 112 is measured (step S140), and it is checked whether the measured load is an overload greater than a given value (step S141). In the event of overload, the compression reference decode mode is selected (step S124). When the load is less than the given value, the normal full reference decode mode is selected (step S123).

In this way, according to the fifth decoding mode selection method, the optimum decoding mode can be selected according to the load of access for the external memory 112. Accordingly, it becomes possible to prevent the decoding from being broken down due to the overload of memory access while minimizing picture quality degradation in the decoding process.

(Sixth Decoding Mode Selection Method)

Figure 11:
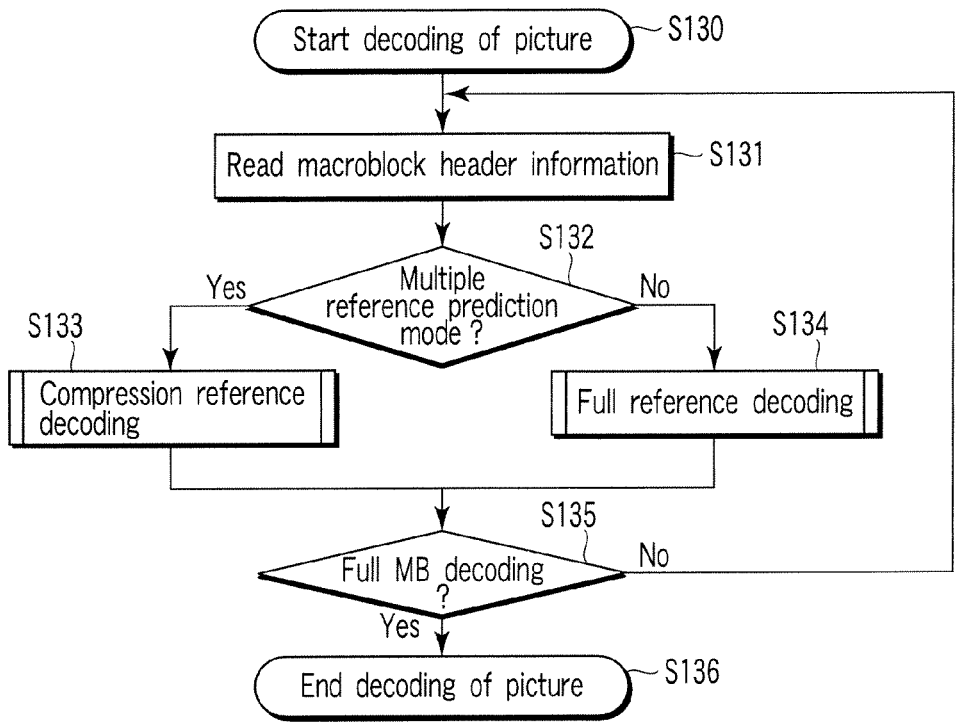
FIG. 11 is a flow chart of explaining a sixth decoding mode selection method according to the embodiment.

The sixth decoding mode selection method of the embodiment is described with reference to FIG. 11. In the sixth decoding mode selection method, the decoding mode is selected in units of encoded pixel block. When decoding of an encoded picture is begun (step S130), header information of a certain macroblock is read in units of encoding (step S131). It is determined whether a prediction mode for a to-be-decoded pixel block is a "multiple-reference prediction mode", namely, a mode for generating a predictive picture signal using multiple reference pictures, according to read header information (step S132).

Concretely, the predictive picture signal is generated by an average of a plurality of reference pictures or a linear sum of them in the multiple reference prediction mode. When the prediction mode is determined to be the multiple-reference prediction mode in step S132, the encoded picture is decoded by a compression reference decode mode using, as a reference picture, the compressed/decompressed picture obtained by decompressing the compressed decoded picture read from the second frame memory 114 (step S133). When it is determined in step S132 that the prediction mode is not the multiple-reference prediction mode, that is, when the prediction mode is determined to be a single reference prediction mode for generating a predictive picture signal using a single reference picture, the encoded picture is decoded by the normal full reference decode mode (step S134). Such a decoding is done for all macroblocks in the encoded picture (step S135). If all macroblocks in the encoded picture have been completely decoded, decoding of the encoded picture is finished (step S136).

The pixel block to which the multiple-reference prediction mode is applied needs a high memory bandwidth to read reference picture. In contrast, in the case of the single reference prediction mode the necessary memory bandwidth is small.

According to the sixth decoding mode selection method, the decoding modes are switched according to a different inter-frame prediction mode in units of encoded pixel block. Concretely speaking, (1) In the multiple-reference prediction mode in which the memory bandwidth increases, the decoding is done in the compression reference decoding mode.

(2) In the single-reference prediction mode, the decoding is performed in the non-compression decoding mode.

As a result, the picture quality degradation of the reconstructed picture can be suppressed to be minimized while reducing the peak memory bandwidth.

(Seventh Decoding Mode Selection Method)

Figure 12:
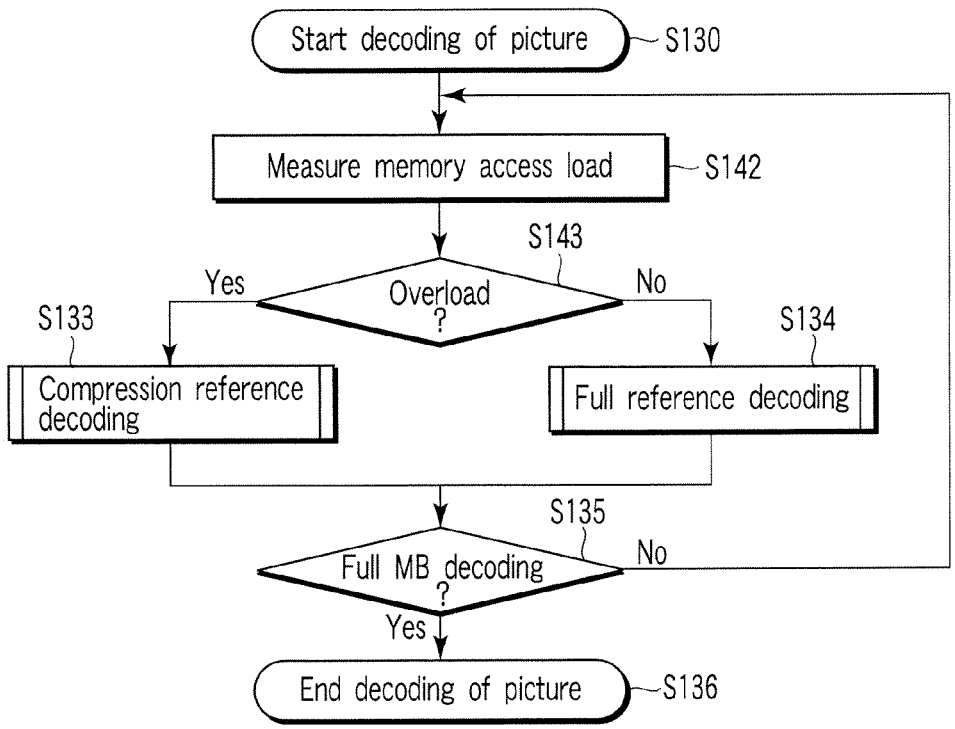
FIG. 12 is a flow chart of explaining a seventh decoding mode selection method according to the embodiment.

The seventh decoding mode selection method according to the embodiment will be described referring to FIG. 12. The seventh decoding mode selection method selects an operation mode in units of encoded pixel block like the sixth decoding mode selection method. In the sixth decoding mode selection method, the full reference decode mode (step S134) or the compression reference decode mode using the compression reference frame memory (step S133) is selected by the prediction mode of each pixel block (macroblock) as shown in FIG. 11 (step S132).

In the seventh decoding mode selection method, the load of memory access for the external memory 112 is measured (step S142). It is checked whether the measured load is overload of greater than a given value (step S143). In the event of overload, the compression reference decode mode is selected (step S133). When the load is less than a given value, the normal full reference decode mode is selected (step S134). Such a decoding mode selection is done in units of pixel until it is determined that all macroblocks (MB) have been completely finished in step S135.

In this way, according to the seventh decoding mode selection method, because the optimum decoding mode can be selected in units of pixel according to the load of memory access, it becomes possible to prevent the decoding from being broken down due to the overload of memory access while minimizing picture quality degradation in the decoding process.

(Full Reference Decode Process)

Figure 13:
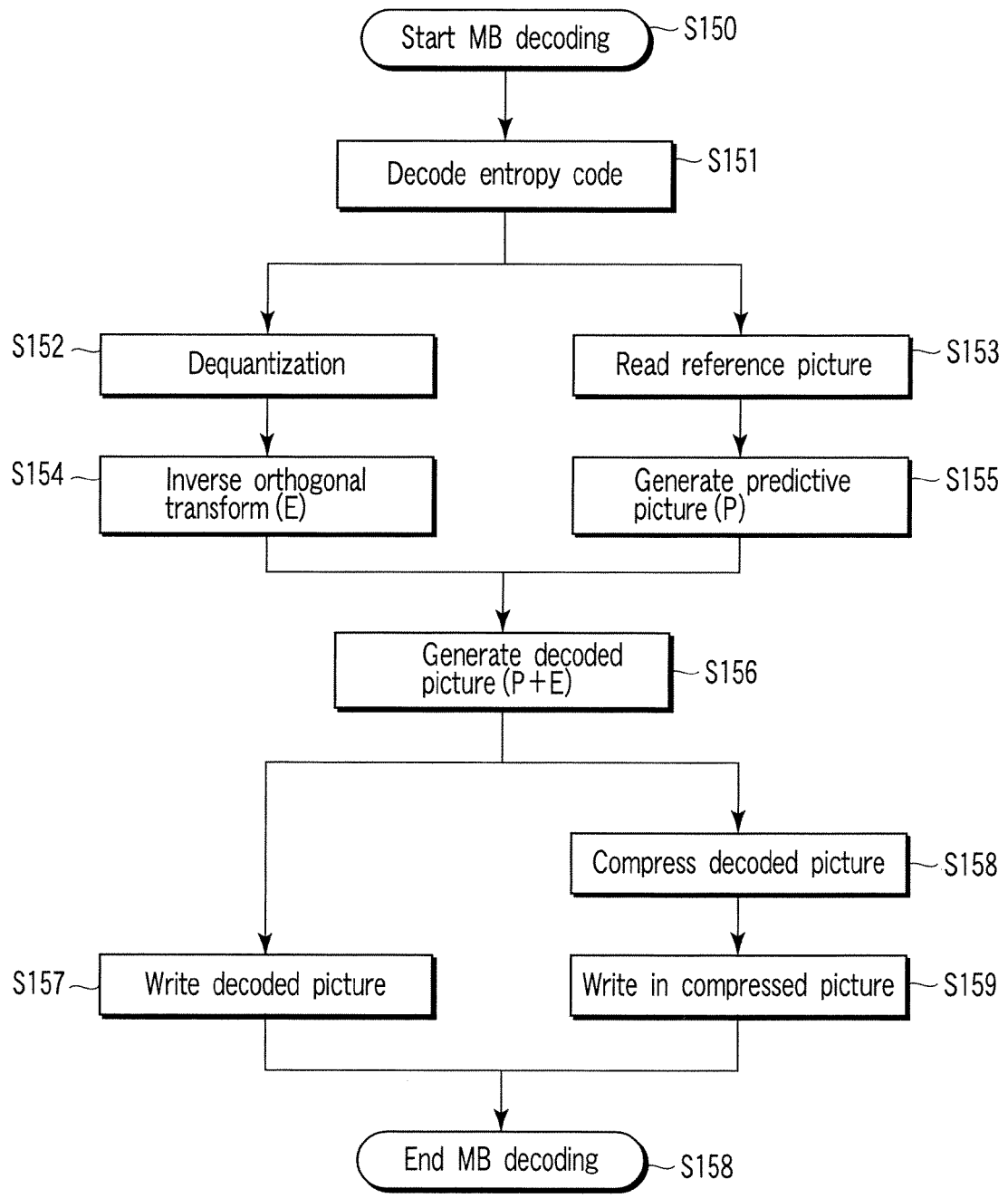
FIG. 13 is a flow chart of representing a procedure of a decoding process executed in units of macroblock using a non-compressed picture.

The process of the full reference decoding (steps S103, S113, S123 and S134) shown in FIGS. 6 to 12 will be described in detail referring to FIG. 13 showing a flow of the full reference decode process in units of macroblock.

When decoding of each encoded macroblock is started (step S150), the entropy code of the encoded macroblock data is decoded to generate quantized orthogonal transform coefficients, a prediction mode and information of a motion vector (step S151). The orthogonal transform coefficients generated in step S151 are subjected to dequantization (step S152) and inverse orthogonal transform (step S154) to produce a prediction error signal E.

A reference picture signal is read based on the prediction mode and the motion vector information generated in step S151 (step S153), and a predictive picture P is generated according to the prediction mode (step S155). The prediction error signal E and the generated predictive picture P are added to generate a decoded picture (step S156). The generated decoded picture is written in the first frame memory 113 (step S157), and in the second frame memory 114 (step S159) thought the compression process (step S158). The decoded picture is written in the frame memories 113 and 114 according to the picture type of the encoded picture and the following rules.

(Rule 1) The encoded picture used as a reference picture (I and P pictures in the case of MPEG-2): the non-compression decoded picture is written in the first frame memory 113, and the compressed/decompressed decoded picture is written in the second frame memory 114.

(Rule 2) The encoded picture unused as a reference picture (B picture in the case of MPEG-2): when the reconstructed picture signal for displaying the compressed/decompressed picture is used, the compressed picture is written in the second frame memory 114 (step S159) but writing of the non-compression decoded picture in the first frame memory 113 (step S157) is not done.

When the reconstructed picture signal for displaying the non-compression decoded picture is used, the compression of the decoded picture (step S158) and writing of the compressed picture in the second frame memory 114 (step S159) are not done, but the non-compression decoded picture is written in the first frame memory 113 (step S157).

(Compression Reference Decode Process)

The process of the compression reference decoding (steps S104, S115, S117, S119, S124 and S133) shown in FIGS. 6 to 12 will be described in detail referring to FIG. 14 showing a flow of a compression reference decoding process executed in units of macroblock.

In FIG. 14, the process before generating the prediction error signal E is similar to the process of the full decoding of FIG. 13. The predictive picture P is generated using the compressed/decompressed picture as a reference picture as described hereinafter. A compressed picture is read from the second frame memory 114 based on the prediction mode generated by the entropy decoding process (step S151) and the motion vector information (step S161). The read compressed picture is decompressed (step S162). A predictive picture P is generated using the compressed/decompressed picture obtained by step S162 as a reference picture (step S155).

A decoded picture is generated by adding the prediction error signal E and predictive picture P generated in this way (step S156). The decoded picture is written in the frame memories 113 and 114 according to the rules 1 and 2 like the full reference decoding of FIG. 13.

There will be explained a concrete example of compression/decompression process of decoded picture in the video decoding apparatus according to the embodiment.

(First Concrete Example of Compression/Decompression Process)

Figure 15:
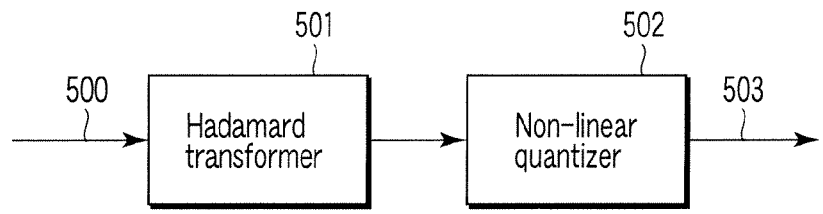
FIG. 15 is a block diagram of a compression device for a decoded picture as a first example.
Figure 16:
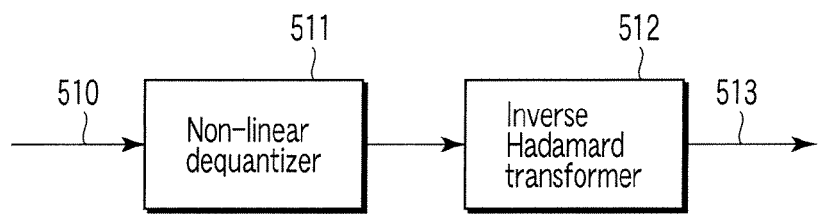
FIG. 16 is a block diagram of a decompression device for a decoded picture as a first example.

FIGS. 15 and 16 show the first concrete example of the compression/decompression process of decoded picture. In the first example of compression/decompression method, the decoded picture signal 500 is input to the compression device (corresponding to the compression device 115 of FIG. 1) shown in FIG. 15 in units of two-dimensional block of 4×4-pixel block or 8×8-pixel block or in units of one-dimensional block of 4×1-pixel block or 8×1-pixel block. In the compression device of FIG. 15, Hadamard transform is done by a Hadamard transform device 501 every input block. The transform coefficient obtained by Hadamard transform is subjected to non-linear quantization with the non-linear quantizer 502 thereby to compress the amount of data. The information of the transform coefficient 503 subjected to the non-linear quantization is stored in the frame memory 114 as a compressed picture signal.

The compressed picture signal 510, namely the nonlinear quantized transform coefficient is read from the second frame memory 114 to the decompression device shown in FIG. 16. The compressed picture signal 510 input to the decompression device is subjected to non-linear dequantization with the non-linear dequantizer 511, and the non-linear dequantized transform coefficient is subjected to inverse Hadamard transform with the inverse Hadamard transform device 512, whereby a decompressed picture signal 513 (compressed/decompressed picture signal) is generated.

(Modification of a Decompression Process)

Figure 17:
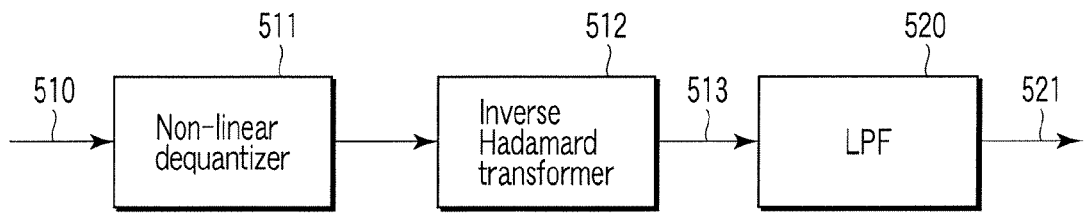
FIG. 17 is a block diagram of a modification of the decompression device of FIG. 16.

FIG. 17 shows modification of the decompression process shown in FIG. 16, wherein a low pass filter 520 is disposed on the rear stage of the inverse Hadamard transform device 512. In the first concrete example of compression/decompression process, since the quantization process is used, the decompressed picture signal 513 is a decoded picture signal 500 input to the compression device on which a compression noise of the compression/decompression process is superimposed. Since the first compression/decompression process is based on Hadamard transform and non-linear quantization executed in units of pixel block, the compression noise is a noise in pixel block unit. The noise in pixel block unit causes stepped non-continuation on a compressed/decompressed picture at the boundary between pixel blocks. It is effective to perform low pass filtering on the compressed/decompressed picture for this stepped compression noise to be removed.

In the example shown in FIG. 17, since high-frequency components occurring due to the stepped noise is removed from the compressed/decompressed picture 513 provided by the non-linear dequantization and inverse Hadamard transform with a low pass filter 520, the compression distortion occurring due to compression and decompression is reduced, with the result that a picture whose picture quality deterioration is decreased subjectively can be reconstructed.

In the video decoding apparatus shown in FIG. 1, the decompression device 116 for decompressing the compressed picture signal stored temporarily in the second frame memory 114 and read therefrom as a reference picture for generating a predictive picture preferably comprises a decompression device without the low pass filter shown in FIG. 16. The decompression device 117 for decompressing the compressed picture signal stored temporarily in the second frame memory 114 and read therefrom for display preferably comprises a decompression device including the low pass filter 520 shown in FIG. 17. In other words, the compression noise is removed from the reconstructed picture for use in display, which influences subjectivity picture quality, with low pass filter 520. In the case that the compressed picture signal is read as a reference picture, a calculation amount for the decoding process or a hardware cost is reduced by omitting the lowpass filter. While improving the subjectivity picture quality of the reconstructed picture to be displayed, the calculation amount for decoding process or the hardware cost can be minimized.

(Second Concrete Example of Compression/Decompression Process)

Figure 18:
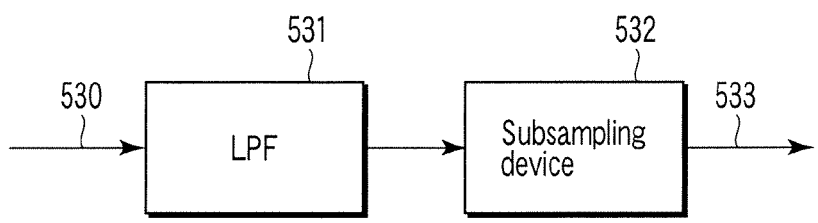
FIG. 18 is a block diagram of a compression device for a decoded picture as a second example.
Figure 19:
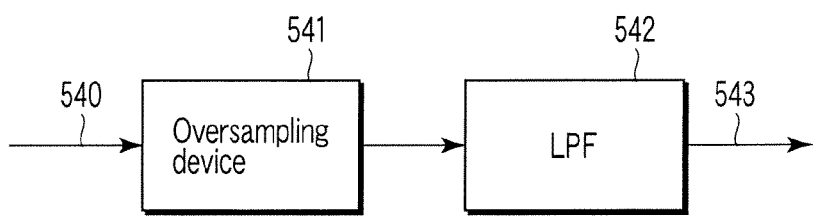
FIG. 19 is a block diagram of a decompression device for a decoded picture as a second example.

FIGS. 18 and 19 show the second concrete example of the compression/decompression process of decoded picture. In the second compression/decompression method, the compression device (corresponding to the compression device 115 of FIG. 1) shown in FIG. 18 subjects the decoded picture signal 530 to two-dimensional or one-dimensional band limiting using two-dimensional or one-dimensional low pass filter 531. Thereafter, the compression process is done by subsampling the pixels in one or both of horizontal and vertical directions with the subsampling device 532 to generate a compressed picture 533.

The compressed picture 540 is input to the decompression device shown in FIG. 19. The decompression process is performed on the compressed picture signal 540 by interpolation using an over-sampling device 541 and a low pass filter 542, whereby a decompressed picture signal 543 (compressed/decompressed picture signal) is generated.

(Third Concrete Example of Compression/Decompression Process)

The third concrete example of compression/decompression process of decoded picture will be described referring to FIGS. 20 and 21. In the third concrete example of compression/decompression process, 4-point one-dimensional Hadamard transform is done on a luminance signal of the decoded picture signal, linear quantization is done on dc components, and non-linear quantization is done on ac components, with the result that the data amount is compressed to ½. As to a color-difference signal, every two pixels in a horizontal direction are averaged. In other words, the horizontal pixels are sub-sampled to ½, whereby the data amount is compressed to ½.

According to the compression device shown in FIG. 20, each pixel of the luminance signal in the decoded picture signal is composed of 8 bits, and 4 pixels continuing in the horizontal direction are input to a 4×1 Hadamard transform device 600. The Hadamard transform device 600 outputs a Hadamard transform coefficient of 10 bits generated by Hadamard transform. Equation (1) represents operation of the 4×1 Hadamard transform device 600.

$$\begin{pmatrix} y'_0 \\ y'_1 \\ y'_2 \\ y'_3 \end{pmatrix} = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} Y_0 \\ Y_1 \\ Y_2 \\ Y_3 \end{pmatrix} \quad (1)$$

where Y0, Y1, Y2, and Y3 are input pixel signals, and y'0, y'1, y'2 and y'3 indicate Hadamard transform coefficients as output signals.

The maximum frequency component y'3 of the Hadamard transform coefficients is canceled, and the coefficients y'0, y'1 and y'2 are shifted by 2 bits with the bit shifter 601 and linear-quantized to a signal of 8 bits. The dc component y'0 of the Hadamard transform coefficient quantized to the signal of 8 bits is output via the multiplexer 604 as it is. The midrange frequency components y'1 and y'2 of the Hadamard transform coefficients are quantized to the signal of 8 bits with the bit shifter 601, and then to signals of 5 bits and 3 bits using non-linear quantization tables 602 and 603 respectively. The dc component quantized to the signal of 8 bits and the midrange frequency component quantized to the signals of 5 bits and 3 bits are multiplexed in bit unit with the multiplexer 604 and output as a signal of 16 bits.

By the process, the luminance component of the decoded picture signal is converted from a signal of 32 bits of 4 pixel×8 bits to a signal of 16 bits. In other words, the data amount is decreased to ½. The color-difference signal in the decoded picture signal is composed of a Cb signal of 8 bits and a Cr signal of 8 bits. The Cb and Cr signals are input to the subsampling device 605 in units of horizontally two pixels to calculate an average of two pixels and output it. The average of the horizontally two pixels of each of the Cb and Cr signals are rounded to 8 bits. The Cb and Cr signals are multiplexed with the multiplexer 606 to obtain a signal of 16 bits.

The above process sub-samples the color-difference signal to ½, resulting in compressing it to ½. In this way, the compression device of FIG. 20 suppresses compression noise with respect to the luminance signal by the non-linear quantization optimized for signal distribution while holding frequency components more than ½ of the decoded picture signal to be compressed by Hadamard transform, resulting in reducing data to ½.

On the other hand, the color-difference signal is horizontally sub-sampled to ½ by simple calculation using importance of its high-frequency component being low, resulting in reducing data amount of the signal to ½ with a low cost. Accordingly, it is possible to compress the decoded picture with low calculation amount and scarce hardware while suppressing picture quality degradation.

FIG. 21 shows a decompression device to decompress the decoded picture signal compressed with the compression device of FIG. 20. In the decompression device of FIG. 21, a signal obtained by compressing the luminance signal to 16 bits every four pixels is input to a bit division device 704. The bit division device 704 divides the 16-bit signal into a 8-bit signal corresponding to dc component of the luminance signal and a 5-bit signal and 3-bit signal corresponding to the midrange frequency component thereof. The two signals of midrange frequency components are dequantized by non-linear inverse quantization tables 702 and 703, respectively. The dc component and the dequantized midrange frequency component are input to a 4×1-inverse Hadamard transform device 700. Further, 0 is input to the inverse Hadamard transform device 700 as a coefficient corresponding to the maximum frequency component. The luminance signal subjected to 4×1-inverse Hadamard transform with the inverse Hadamard transform device 700 is output as a decoded picture signal decompressed in units of four pixels.

About the color-difference signal, a 16-bit signal wherein each of Cb and Cr signals is compressed by every two pixels and multiplexed is input to the bit division device 706. The 8-bit Cb and Cr signals are output from the bit division device 706. The 8-bit Cb and Cr signals each are up-sampled to a horizontal two-pixel signal, that is, doubled in pixel, and output as two-pixel data. As to the luminance signal in this way, the decompression device of FIG. 21 can reconstruct frequency components more than ½ of the decoded picture signal before compression, by non-linear inverse quantization and inverse Hadamard transform. The color-difference signal can be decompressed by a very simple process called doubling of pixel. Accordingly, it becomes possible to decompress the compressed decoded picture with small calculation amount and scarce hardware while suppressing picture quality degradation.

Second Embodiment

FIG. 22 shows a video decoding apparatus according to the second embodiment. In the first embodiment shown in FIG. 1, in order to display a decoded picture, a compressed picture signal stored in the second frame memory 114 is read and decompressed with the second decompression device 117, and then send to the back-end processor 105 to generate the reconstructed picture signal 110. In contrast, in the second embodiment, the decoded picture signal 109 is read not from the second frame memory 114 storing compressed picture signals, but from the first frame memory 113 storing non-compression decoded picture signals as shown in FIG. 22, and supplied to the back end processor 105. Therefore, the second decompression device 117 in FIG. 1 is needless.

When the non-compression decoded picture signal is input to the back-end processor 105 of a display system in this way, it is possible to display a video that the compression noise is reduced and picture quality is not almost deteriorated. In the second embodiment, data read and transfer amount of the decoded picture signal 109 for use in display increases in comparison with the first embodiment. Further, since the decoded picture of B picture must be written in the first frame memory 113 by non-compression, the necessary memory bandwidth increases. However, because the compressed picture signal stored in the second frame memory 114 can be used like the first embodiment when the reference picture signal requiring the high memory bandwidth in general is read, the memory bandwidth can be decreased significantly. Accordingly, the total memory bandwidth can be reduced in comparison with the normal decoding apparatus.

Third Embodiment

Figure 23:
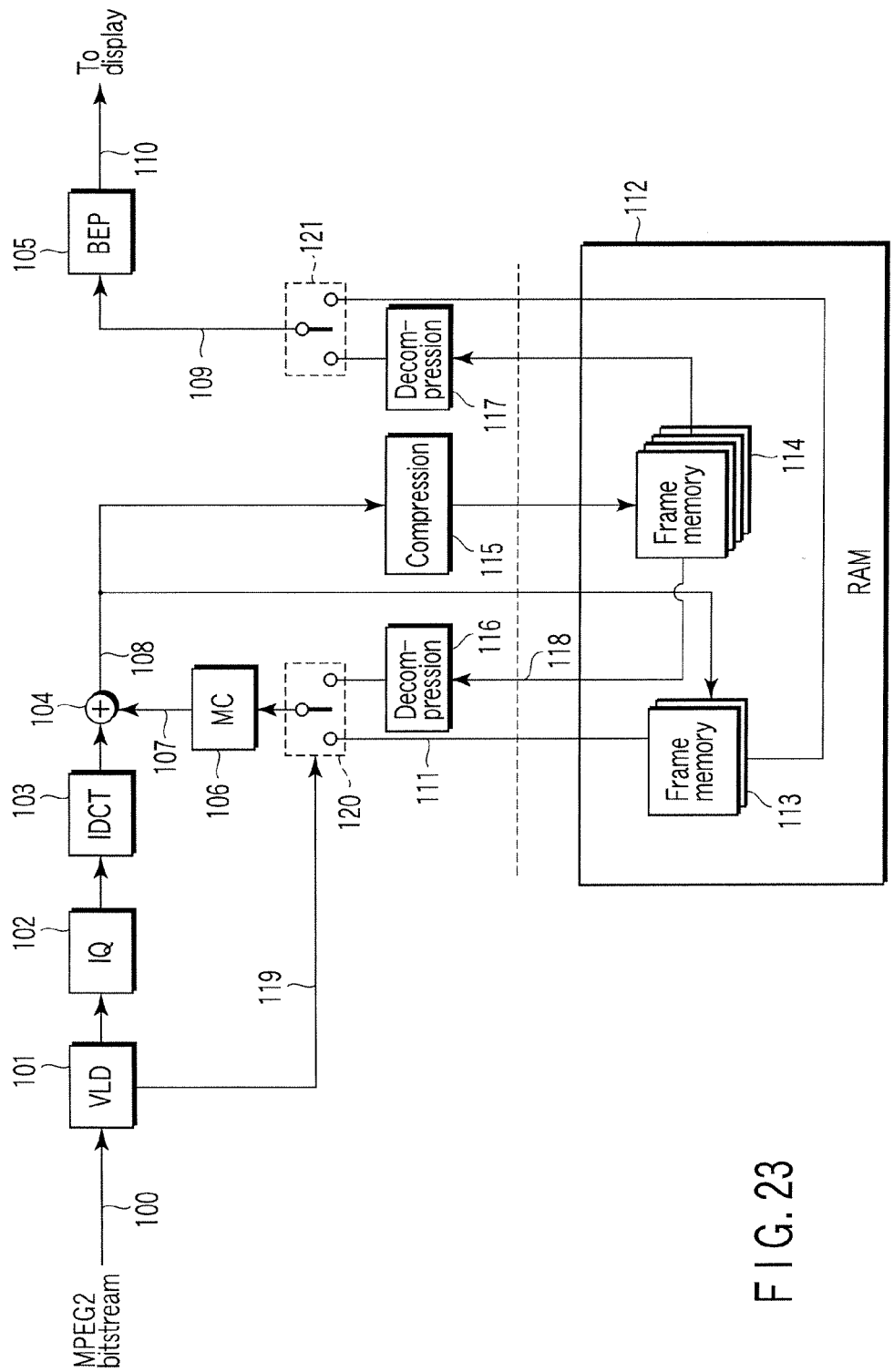
FIG. 23 is a block diagram of a video decoding apparatus according to a third embodiment.

FIG. 23 shows a video decoding apparatus according to the third embodiment. As is clear from the above description, in the first and second embodiments, there is trade off between the quality of the reconstructed picture signal 110, namely, picture quality of the display picture and the reduced amount of the memory bandwidth. The third embodiment makes it possible to select adaptively the methods of the first and second embodiment.

According to FIG. 23, there is provided a switch 121 which switches between the non-compression decoded picture signal read from the first frame memory 113 and the compressed/decompressed picture signal read from the second frame memory 114 and decompressed with the second decompression device 117 and supplies them to the back-end processor 105 selectively. On the basis of such a configuration, the switch 121 may be operated so that the compressed/decompressed picture signal from the second decompression device 117 is supplied to the back-end processor 105 in the case of making much of the reduced amount of the memory bandwidth, and the non-compression decoded picture signal is supplied to the back-end processor 105 in the case of prioritizing the picture quality of the display picture.

Fourth Embodiment

Figure 24:
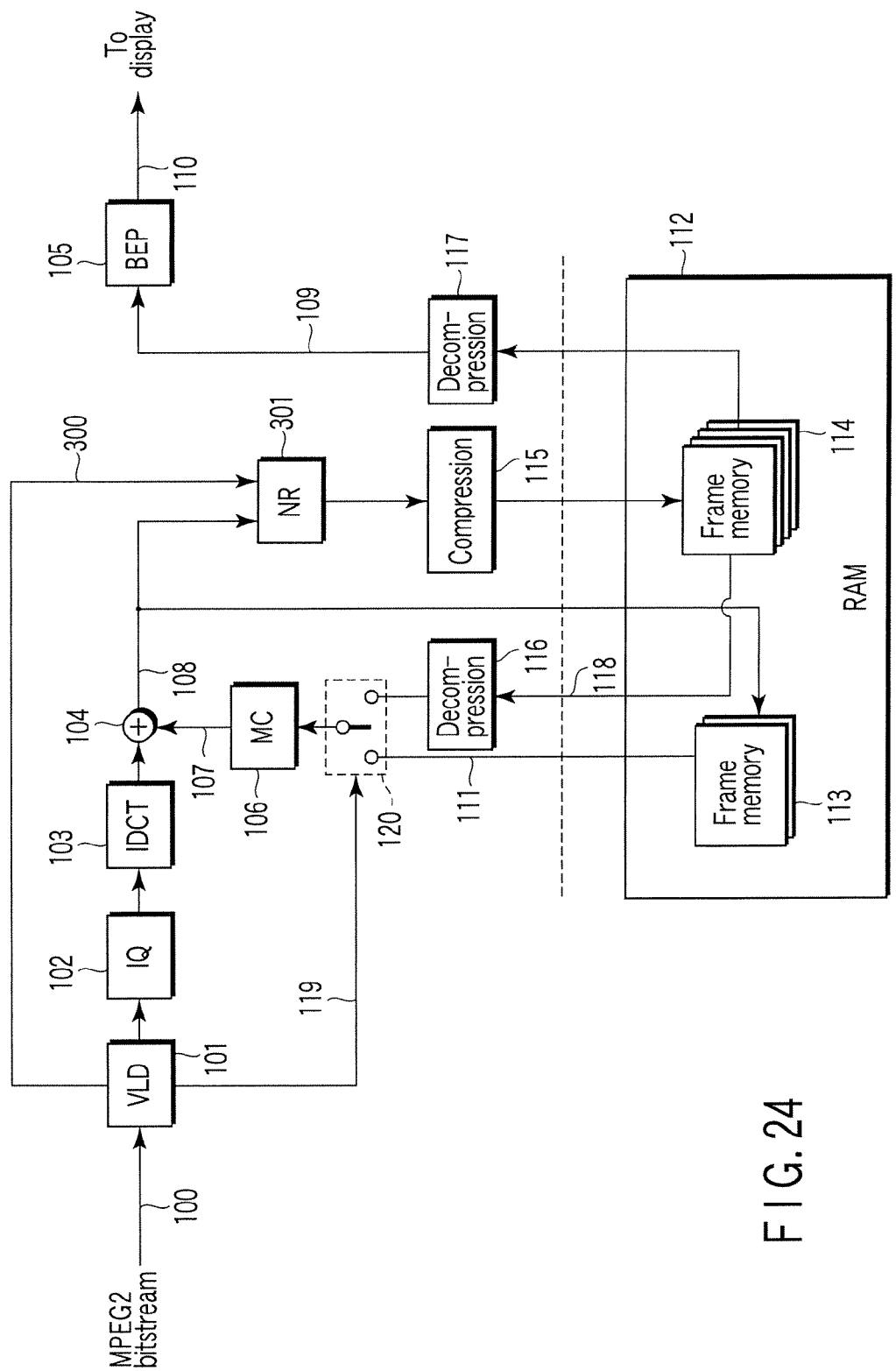
FIG. 24 is a block diagram of a video decoding apparatus of a fourth embodiment.

In the video decoding apparatus according to the fourth embodiment shown in FIG. 24, a noise canceller 301 is provided between an adder 104 and a compression device 115. The noise canceller 301 removes noise from the decoded picture signal 108 output from the adder 104. The decoded picture signal from which the noise is removed is compressed by the compression device 115, and stored in the second frame memory 114.

According to the fourth embodiment, the memory bandwidth of the external memory is reduced like the previous embodiments. The noise canceller 301 is provided to remove coding distortion peculiar to the compression method such as block distortion or mosquito noise of the video encoded data 100 compressed with MPEG-2 and the like. The noise canceller 301 cancels noise adaptively using information 300 such as quantization step size or an encoding mode generated from the variable length decoder 101.

In the normal video decoding apparatus, when a noise cancellation process different from encoding is put in a decoding loop, mismatching occurs between the encoding and decoding of the reference picture to cause distortion in the decoded picture. In the fourth embodiment, the noise cancellation is not performed on the non-compression decoded picture signal which is not compressed, but only on the decoded picture signal compressed and stored in the second frame memory 114. As a result, the decoding process using the non-compression decoded picture signal as a reference picture signal does not cause mismatching between the encoding and decoding.

The decoding process using the compressed picture signal as a reference picture signal enables reduction of the compression noise as well as noise cancellation of the video encoded data 100. Since the video signal obtained by compressing and decompressing the decoded picture signal subjected to noise cancellation is supplied to the display system through the back-end processor 105, it is possible to reconstruct a high quality video reduced in noise while reducing the total memory bandwidth.

According to the present invention, both of a decoded picture signal and a compressed picture signal obtained by compressing the decoded picture signal are stored in a memory, and a picture signal to be adaptively read from the memory in order to generate a reference picture signal at the time of decoding is selected. As a result, it becomes possible to suppress distortion occurring due to decoding and propagating over time to minimum while reducing the memory bandwidth at the time of decoding and prevent the reconstructed picture from being extremely deteriorated in quality.

According to the present invention, a reconstructed picture is prevented from being largely deteriorated in picture quality by minimizing temporarily-spread of distortion occurring due to the use of compression in a process of generating a reference picture while reducing a memory bandwidth at the time of decoding, Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video decoding method comprising:
  decoding video encoded data using a predictive picture signal for a video signal to generate a decoded picture signal;
  compressing the decoded picture signal to generate a compressed picture signal;
  storing the decoded picture signal in a first memory;
  storing the compressed picture signal, which is a compressed version of the decoded picture signal stored in the first memory, in a second memory;
  decompressing the compressed picture signal read from the second memory to generate a compressed/decompressed picture signal;
  selecting one of the decoded picture signal read from the first memory and the compressed/decompressed picture signal as a reference picture signal according to at least one of a coding type of the video encoded data in picture unit and a prediction mode in block unit;
  storing the reference picture signal in a third memory; and
  performing motion compensation on the reference picture signal to generate a predictive picture signal, wherein
  the selecting includes selecting the decoded picture signal read from the first memory at the time that the prediction mode in block unit indicates a mode for generating the predictive picture signal from a forward prediction pixel block, and selecting two reference blocks of the compressed/decompressed picture signal at the time that the prediction mode in block unit a mode for generating the predictive picture signal from a dual prime prediction pixel block.

2. The method according to claim 1, wherein the selecting includes selecting the decoded picture signal read from the first memory at the time that the coding type in picture unit is a coding type that the decoded picture signal is used as the reference picture signal, and selecting the compressed/decompressed picture signal at the time that the coding type in picture unit indicates a coding type that the decoded picture signal generated by the decoding is unused as the reference picture signal.

3. The method according to claim 1, wherein the coding type in picture unit represents either of an I picture, a P picture and a B picture, and the selecting includes selecting the decoded picture signal read from the first memory at the time that the decoded picture signal represents the P picture, and selecting the compressed/decompressed picture signal at the time that the decoded picture signal represents the B picture.

4. The method according to claim 1, wherein the selecting includes selecting the decoded picture signal read from the first memory at the time that the prediction mode in block unit indicates a first mode for generating a predictive picture signal from a single block of the reference picture signal in the motion compensation, and selecting the compressed/decompressed picture signal at the time that the prediction mode in block unit indicates a second mode for generating a predictive picture signal by an average of a plurality of blocks of the reference picture signal or a linear sum of the blocks in the motion compensation.

5. The method according to claim 1, wherein the prediction mode in block unit represents that a prediction pixel block of a B picture is one of a forward prediction pixel block, a backward prediction pixel block and a bidirectional prediction pixel block, and the selecting includes selecting the decoded picture signal from the first memory at the time that the prediction mode in block unit indicates a mode for generating the predictive picture signal from the forward prediction pixel block or the backward prediction pixel block, and selecting the compressed/decompressed picture signal at the time that the prediction mode in block unit indicates a mode for generating the predictive picture signal from the bidirectional prediction pixel block.

6. The method according to claim 1, wherein the prediction mode in block unit indicates a mode that at least a prediction pixel block of a P picture represents either of a forward prediction pixel block using a single reference picture and a dual prime prediction pixel block using a plurality of reference pictures.

7. A video decoding apparatus comprising:
  a decoder to decode video encoded data using a predictive picture signal for a video signal to generate a decoded picture signal;
  a compression unit configured to compress the decoded picture signal to generate a compressed picture signal;
  a first memory to store the decoded picture signal;
  a second memory to store the compressed picture signal, such that the first memory stores the decoded picture signal, and the second memory stores the compressed picture signal, which a compressed version of the decoded picture signal stored in the first memory;
  a decompression unit configured to decompress the compressed picture signal read from the second memory to generate a compressed/decompressed picture signal;
  a selector to select one of the decoded picture signal read from the first memory and the compressed/decompressed picture signal as a reference picture signal according to at least one of a coding type of the video encoded data in picture unit and a prediction mode in block unit;
  a third memory to store the reference picture signal; and
  a motion compensator to perform motion compensation on the reference picture signal to generate a predictive picture signal, wherein
  the selector is to select the decoded picture signal read from the first memory at the time that the prediction mode in block unit indicates a mode for generating the predictive picture signal from a forward prediction pixel block, and is to select two reference blocks of the compressed/decompressed picture signal at the time that the prediction mode in block unit indicates a mode for generating the predictive picture signal from a dual prime prediction pixel block.

8. The apparatus according to claim 7, wherein the selector selects the decoded picture signal read from the first memory at the time that the coding type in picture unit indicates a coding type that the decoded picture signal generated by the decoder is used as the reference picture signal, and selects the compressed/decompressed picture signal at the time that the coding type in picture unit indicates a coding type that the decoded picture signal generated by the decoder is unused as the reference picture signal.

9. The apparatus according to claim 7, wherein the coding type in picture unit represents either of an I picture, a P picture and a B picture, and the selector selects the decoded picture signal read from the first memory at the time that the decoded picture signal generated by the decoder is the P picture, and selects the compressed/decompressed picture signal at the time that the decoded picture signal generated by the decoder is the B picture.

10. The apparatus according to claim 7, wherein the selector selects a decoded picture signal read from the first memory at the time that the prediction mode in block unit indicates a first mode for generating a predictive picture signal from a single block of the reference picture signal in the motion compensator, and selects the compressed/decompressed picture signal at the time that the prediction mode in block unit indicates a second mode for generating the predictive picture signal from an average of a plurality of blocks of the reference picture signal or a linear sum of the blocks in the motion compensator.

11. The apparatus according to claim 7, wherein the prediction mode in block unit represents that a prediction pixel block of a B picture indicates one of a forward prediction pixel block, a backward prediction pixel block and a bidirectional prediction pixel block, and the selector selects read decoded picture signal from the first memory at the time that the prediction mode in block unit indicates a mode for generating the predictive picture signal from the forward prediction pixel block or the backward prediction pixel block, and selects the compressed/decompressed picture signal at the time that the prediction mode in block unit indicates a mode for generating the predictive picture signal from the bidirectional prediction pixel block.

12. The apparatus according to claim 7, wherein the prediction mode in block unit indicates a mode that a prediction pixel block of at least a P picture represents either of a forward prediction pixel block using a single reference picture and a dual prime prediction pixel block using a plurality of reference pictures.

13. The apparatus according to claim 7 further comprising a processor to generate a reconstructed picture signal for video display by processing the compressed/decompressed picture signal.

14. The apparatus according to claim 7 further comprising a processor to generate a reconstructed picture signal for video display by processing the decoded picture signal read from the first memory.

15. The apparatus according to claim 7 further comprising a selector to select either of the compressed/decompressed picture signal and the decoded picture signal read from the first memory, and a processor to process a picture signal selected with the selector to generate a reconstructed picture signal for video display.

16. The apparatus according to claim 7, which further comprises a noise canceller to remove an encoding noise contained in the decoded picture signal, and wherein the compression unit is configured to compress the decoded picture signal from which the encoding noise is removed.

17. The apparatus according to claim 7, wherein the compression unit is configured to compress the decoded picture signal by bandlimiting filtering and sub-sampling.

18. The apparatus according to claim 7, wherein the compression unit is configured to compress the decoded picture signal by Hadamard transform and non-linear quantization.

19. The apparatuses according to claim 7, wherein the compression unit is configured to compress the decoded picture signal by subjecting a luminance signal in the decoded picture signal to Hadamard transform and non-linear quantization and subjecting a color-difference signal in the decoded picture signal to bandlimiting filtering and sub-sampling.

20. A non-transitory tangible computer readable storage medium storing instructions of a computer program which when executed by a computer results in performance of steps comprising:
  decoding video encoded data using a predictive picture signal for a video signal to generate a decoded picture signal;
  compressing the decoded picture signal to generate a compressed picture signal;
  storing the decoded picture signal in a first memory;
  storing the compressed picture signal, which is a compressed version of the decoded picture signal stored in the first memory, in a second memory;
  decompressing the compressed picture signal read from the second memory to generate a compressed/decompressed picture signal;
  selecting one of the decoded picture signal read from the first memory and the compressed/decompressed picture signal as a reference picture signal according to at least one of a coding type of the video encoded data in picture unit and a prediction mode in block unit;
  storing the reference picture signal in a third memory; and
  performing motion compensation on the reference picture signal to generate a predictive picture signal, wherein
  the selecting includes selecting the decoded picture signal read from the first memory at the time that the prediction mode in block unit indicates a mode for generating the predictive picture signal from a forward prediction pixel block, and selecting two reference blocks of the compressed/decompressed picture signal at the time that the prediction mode in block unit a mode for generating the predictive picture signal from a dual prime prediction pixel block.

* * * * *